(12) United States Patent
Cheng et al.

(10) Patent No.: US 12,435,807 B2
(45) Date of Patent: Oct. 7, 2025

(54) FLUID FLOW CONTROL SYSTEMS AND METHODS

(71) Applicant: Human Hydrology Devices, Houston, TX (US)

(72) Inventors: Jed-Sian Cheng, Houston, TX (US); Mostafa Jubayar Hasan, Houston, TX (US); Matthew S. Richards, Houston, TX (US)

(73) Assignee: Human Hydrology Devices, Houston, TX (US)

( * ) Notice: Subject to any disclaimer, the term of this patent is extended or adjusted under 35 U.S.C. 154(b) by 165 days.

(21) Appl. No.: 18/336,223

(22) Filed: Jun. 16, 2023

(65) Prior Publication Data

US 2023/0407984 A1    Dec. 21, 2023

Related U.S. Application Data

(60) Provisional application No. 63/353,189, filed on Jun. 17, 2022.

(51) Int. Cl.
*A61M 39/22* (2006.01)
*F16K 24/02* (2006.01)

(52) U.S. Cl.
CPC ................... *F16K 24/02* (2013.01)

(58) Field of Classification Search
CPC ........ A61M 39/225; A61M 2039/0018; A61M 2039/224
See application file for complete search history.

(56) References Cited

U.S. PATENT DOCUMENTS

| 5,810,768 | A  | * | 9/1998 | Lopez ............ | A61M 39/02 604/83 |
| 2010/0292674 | A1 | * | 11/2010 | Jepson ............ | A61M 39/26 604/537 |
| 2020/0022630 | A1 |  | 1/2020 | Haindl |  |
| 2021/0322754 | A1 |  | 10/2021 | Cheng et al. |  |

FOREIGN PATENT DOCUMENTS

EP          0830173 B1    12/2001
WO       00/40291 A1     7/2000

* cited by examiner

*Primary Examiner* — Paul J Gray
(74) *Attorney, Agent, or Firm* — Rothwell, Figg, Ernst & Manbeck, P.C.

(57) ABSTRACT

Systems and methods for controlling fluid flow are described. In some aspects, a system may include a first port, a second port, and a third port. The system may be configured to be in a first state if a male fitting of a device is not inserted in a female fitting of the third port. The valve may block a first fluid path defined between the first port and the third port if the system is in the first state. The system may also be configured to be in a second state if a male fitting of a device is fully inserted in the female fitting of the third port. The valve may block a second fluid path defined between the first port and the second port if the system is in the second state.

21 Claims, 21 Drawing Sheets

FLUID FLOW CONTROL SYSTEMS AND METHODS

CROSS-REFERENCE TO RELATED APPLICATION

The present application claims the benefit of priority to U.S. Provisional Application Ser. No. 63/353,189, filed on Jun. 17, 2022, which is incorporated herein by reference in its entirety.

FIELD OF THE DISCLOSURE

This disclosure relates to systems and methods for controlling fluid flow. For example, this disclosure relates to systems and methods that may be used to drain fluid from and inject fluid to a subject with the same device.

BACKGROUND

Existing bladder drainage system typically include a Foley catheter connecting the bladder of a patient to a urine-collecting bag via a drainage port and tubing. If there is a need to irrigate the bladder or administer a medication to the bladder, the system needs to be manually disconnected at the drainage port site to connect a syringe to the Foley catheter to have access to the bladder. Alternatively, if the drainage bag is not disconnected from the Foley catheter, the drainage bag pathway needs to be clamped so that a syringe can flush solution through a three-way stopcock device to the bladder. Other existing fluid flow control systems have similar structures.

SUMMARY

Existing fluid flow control systems and methods suffer (e.g., existing bladder drainage systems, existing feeding tube systems, and existing infusion systems) suffer from various disadvantages. For example, these systems are not user friendly or reliable, are prone to user error, and can decrease the cleanliness and sterility of the systems, which can potentially cause patient harm and the loss of patient samples. In addition, debris and clots in the existing systems can cause system dysfunction and damage, and contaminate the patient's sample or instilled medium (e.g., medication, sterile water, antibiotics, chemo agent, or nutrition).

Some aspects of the present disclosure may overcome one or more issues associated with conventional fluid flow control systems and methods. Some aspects of the present disclosure may provide novel fluid flow control systems and methods that are easier to use and can avoid system dysfunction (e.g., caused by debris and clots) and cross-contamination between the systems and the fluid.

In one aspect, the present disclosure provides a system for directing fluid flow. The system may include a first port, a second port, a third port, a body including a central passage, and a valve. The first port may be configured to be coupled to a first channel. The second port may be configured to be coupled to a second channel. The third port may be configured to be coupled to a device defining a third channel. The third port may include a female fitting. The central passage may connect the first port, the second port, and the third port. The valve may include a member that includes a slant lower surface. The slant lower surface may define a lower boundary of the member. The system may be configured to be in a first state if a male fitting of the device is not inserted in the female fitting of the third port. The valve may be configured to be in a first position if the system is in the first state. The valve may be configured to block a first fluid path defined between the first port and the third port if the valve is in the first position. The system may be configured to be in a second state if a male fitting of the device is fully inserted in the female fitting of the third port. The valve may be configured to be in a second position if the system is in the second state. The valve may be configured to connect the first fluid path and block a second fluid path defined between the first port and the second port if the valve is in the second position. The system may be configured such that inserting a male fitting into the female fitting of the third port causes the system to transition from the first state to the second state. The slant lower surface of the member of the valve may be configured to push a substance from the central passage to the second port when the system transitioning from the first state to the second state.

In another aspect, the present disclosure provides a system for directing fluid flow. The system may include a first port, a second port, a third port, a body including a central passage, and a valve. The first port may be configured to be coupled to a first channel. The second port may be configured to be coupled to a second channel. The third port may be configured to be coupled to a device defining a third channel. The third port may include a female fitting. The central passage may connect the first port, the second port, and the third port. The valve may include a member and an elastic flange. A periphery of the elastic flange may be fixed to the body. The system may be configured to be in a first state if a male fitting of the device is not inserted in the female fitting of the third port. The valve may be configured to be in a first position if the system is in the first state. The valve may be configured to block a first fluid path defined between the first port and the third port if the valve is in the first position. The system may be configured to be in a second state if a male fitting of the device is fully inserted in the female fitting of the third port. The valve may be configured to be in a second position if the system is in the second state. The valve may be configured to connect the first fluid path and block a second fluid path defined between the first port and the second port if the valve is in the second position. The system may be configured such that inserting a male fitting into the female fitting of the third port causes the system to transition from the first state to the second state. A shape of the elastic flange of the valve in the first position may be different than a shape of the elastic flange of the valve in the second position. The elastic flange may bias the valve toward the first position of the valve.

In some aspects, the valve may be made out of a material comprising an elastomer (e.g., silicone).

In another aspect, the present disclosure provides a system for directing fluid flow. The system may include first, second, and third ports, a body comprising a central passage, a valve, and one or more springs. The first port may be configured to be coupled to a first channel. The second port may be configured to be coupled to a second channel. The third port may be configured to be coupled to a device defining a third channel. The third port may include a female fitting. The central passage may connect the first port, the second port, and the third port. The valve may include a member. The system may be configured to be in a first state if a male fitting of the device is not inserted in the female fitting of the third port. The valve may be configured to be in a first position if the system is in the first state. The valve may be configured to block a first fluid path defined between the first port and the third port if the valve is in the first position. The system may be configured to be in a second state in which a male fitting of the device is fully inserted in the female fitting of the third port. The valve may be configured to be in a second position if the system is in the second state. The valve may be configured to connect the first fluid path and block a second fluid path defined between the first port and the second port if the valve is in the second position. The system may be configured such that inserting a male fitting into the female fitting of the third port causes the system to transition from the first state to the second state. The one or more springs may bias the valve toward the first position of the valve. The one or more springs may be positioned such that the one or more springs are isolated from the fluid flow in the system.

In some aspects, the system may further include one or more spring guides for positioning the one or more springs. In some aspects, the system may further include one or more separators, and each of the one or more separators may be positioned between one of the one or more springs and the member of the valve. In some aspects, the valve may include a flange including first and second surfaces, the first surface of the flange may face the third port, the second surface of the flange may face away from the third port, and the second surface of the flange may engage the one or more springs.

In some aspects, the member may include a slant lower surface that defines a lower boundary of the member, and the slant lower surface may be configured to push a substance from the central passage to the second port when the system transitions from the first state to the second state.

In some aspects, the female fitting of the third port may have an internal surface and an external surface, and the external surface of the female fitting may include a thread configured to engage a Luer lock.

In some aspects, the valve may include a stem, and a top of the stem may extend into the third port in a direction away from the central passage if the valve is in the first position. In some aspects, if the valve is in the second position, the top of the stem is below a thread on an external surface of the female fitting that is configured to engage a Luer lock in a direction toward the central passage. In some aspects, the valve may further include a flange, and the stem may extend from the flange.

In some aspects, the central passage may have a length extending between the first port and the second port, the central passage may have a cross-section in a plane parallel to the length, and the cross-section may be rectangular. In some aspects, the central passage may have a length extending between the first port and the second port, the central passage may have a cross-section in a plane parallel to the length, and the cross-section may be circular. In some aspects, the third port may include a first portion having a first diameter and a second portion having a second diameter greater than the first diameter.

In some aspects, the member of the valve may include a channel, a first opening, and a second opening, and the system may be configured such that, if the system is in the second state, fluid flows from the first port, into the first opening of the member, through the channel of the member, out of the second opening of the member, and out of the third port. In some aspects, the member of the valve may include a channel, a first opening, and a second opening, and the system may be configured such that, if the system is in the second state, fluid flows from the third port, into the second opening of the member, through the channel of the member, out of the first opening of the member, and out of the first port.

In some aspects, the valve may be a valve assembly comprising multiple components coupled together. In some aspects, the multiple components may include the member and a stem, and a top of the stem may extend into the third port in a direction away from the central passage if the valve is in the first position. In some aspects, the valve may be manufactured as a single piece.

In another aspect, the present disclosure provides a method for directing fluid flow using a system including a first port, a second port, a third port, a body including a central passage, and a valve including a member. In some aspects, the method may include: connecting the first port to a first channel; connecting the second port to a second channel; and connecting the third port to a device defining a third channel, the third port comprising a female fitting. The first port, the second port, and the third port may be connected to each other via the central passage. The system may be configured to be in a first state if a male fitting of the device is not inserted in the female fitting of the third port. The valve may be configured to be in a first position if the system is in the first state. The system may be configured to be in a second state if the male fitting of the device is fully inserted in the female fitting of the third port. The valve may be configured to be in a second position if the system is in the second state. Connecting the third port to the third channel may include fully inserting the male fitting of the device into the female fitting of the third port. Connecting the third port to the third channel causes the system to transition from the first state to the second state. In the first position, the valve may block a first fluid path defined between the first port and the third port. In the second position, the valve may connect the first fluid path and blocks a second fluid path defined between the first port and the second port. The member of the valve may include a slant lower surface, the slant lower surface may define a lower boundary of the member. Transitioning from the first state to the second state may include the slant lower surface pushing a substance in the fluid from the central passage to the second port.

In another aspect, the present disclosure provides a method for directing fluid flow using a system including a first port, a second port, a third port, a body including a central passage, and a valve including a member and an elastic flange. The method may include: connecting the first port to a first channel; connecting the second port to a second channel; and connecting the third port to a device defining a third channel. The third port may include a female fitting. The first port, the second port, and the third port may be connected to each other via the central passage. A periphery of the elastic flange may be fixed to the body. The system may be configured to be in a first state if a male fitting of the device is not inserted in the female fitting of the third port. The valve may be configured to be in a first position if the system is in the first state. The system may be configured to be in a second state if a male fitting of the device is fully inserted in the female fitting of the third port. The valve may be configured to be in a second position if the system is in the second state. Connecting the third port to the third channel may include fully inserting the male fitting of the device into the female fitting of the third port. Connecting the third port to the third channel may cause the system to transition from the first state to the second state. In the first position, the valve may block a first fluid path defined between the first port and the third port. In the second position, the valve may connect the first fluid path and block a second fluid path defined between the first port and the second port. A shape of the elastic flange of the valve in the first position may be different than a shape of the elastic flange of the valve in the second position. The elastic flange may bias the valve toward the first position of the valve.

In some aspects, the valve may be made out of a material comprising an elastomer (e.g., silicone).

In another aspect, the present disclosure provides a method for directing fluid flow using a system comprising a first port, a second port, a third port, a body including a central passage, a valve including a member, and one or more springs. The method may include: connecting the first port to a first channel; connecting the second port to a second channel; and connecting the third port to a device defining a third channel. The third port may include a female fitting. The first port, the second port, and the third port may be connected to each other via the central passage. The system may be configured to be in a first state if a male fitting of the device is not inserted in the female fitting of the third port. The valve may be configured to be in a first position if the system is in the first state. The system may be configured to be in a second state if the male fitting of the device is fully inserted in the female fitting of the third port. The valve may be configured to be in a second position if the system is in the second state. Connecting the third port to the third channel may include fully inserting the male fitting of the device into the female fitting of the third port. Connecting the third port to the third channel causes the system to transition from the first state to the second state. In the first position, the valve blocks a first fluid path defined between the first port and the third port. In the second position, the valve may connect the first fluid path and block a second fluid path defined between the first port and the second port. The one or more springs may bias the valve toward the first position. The one or more springs may be positioned such that the one or more springs are isolated from the fluid flow in the system.

In some aspects, the system may further include one or more spring guides for positioning the one or more springs. In some aspects, the system may further include one or more separators, and each of the one or more separators may be positioned between one of the one or more springs and the member of the valve. In some aspects, the valve may include a flange including first and second surfaces, the first surface of the flange may face the third port, the second surface of the flange may face away from the third port, and the second surface of the flange may engage the one or more springs.

In some aspects, the member may include a slant lower surface that defines a lower boundary of the member, and the slant lower surface may be configured to push a substance from the central passage to the second port when the system transitions from the first state to the second state.

In some aspects, the female fitting of the third port may have an internal surface and an external surface, and the external surface of the female fitting may include a thread configured to engage a Luer lock.

In some aspects, the valve may include a stem, and a top of the stem may extend into the third port in a direction away from the central passage if the valve is in the first position. In some aspects, if the valve is in the second position, the top of the stem is below a thread on an external surface of the female fitting that is configured to engage a Luer lock in a direction toward the central passage. In some aspects, the valve may further include a flange, and the stem may extend from the flange.

In some aspects, the central passage may have a length extending between the first port and the second port, the central passage may have a cross-section in a plane parallel to the length, and the cross-section may be rectangular. In some aspects, the central passage may have a length extending between the first port and the second port, the central passage may have a cross-section in a plane parallel to the length, and the cross-section may be circular. In some aspects, the third port may include a first portion having a first diameter and a second portion having a second diameter greater than the first diameter.

In some aspects, the member of the valve may include a channel, a first opening, and a second opening, and the system may be configured such that, if the system is in the second state, fluid flows from the first port, into the first opening of the member, through the channel of the member, out of the second opening of the member, and out of the third port. In some aspects, the member of the valve may include a channel, a first opening, and a second opening, and the system may be configured such that, if the system is in the second state, fluid flows from the third port, into the second opening of the member, through the channel of the member, out of the first opening of the member, and out of the first port.

In some aspects, the valve may be a valve assembly comprising multiple components coupled together. In some aspects, the multiple components may include the member and a stem, and a top of the stem may extend into the third port in a direction away from the central passage if the valve is in the first position. In some aspects, the valve may be manufactured as a single piece.

In another aspect, the present disclosure provides a method of directing a fluid between a subject and a container using a system of any of the above aspects. The method may include: connecting the first port to the subject via the first channel; connecting the second port to a container via the second channel; with the system in the first state: using the system to flow fluid from the subject to the central passage via the first port and from the central passage to the container via the second port, or using the system to flow fluid from the container to the central passage via the second port and from the central passage to the subject via the first port.

In some aspects, the method includes setting the system to the second state, and setting the system to the second state includes connecting the third port to the device defining the third channel via the third port. In some aspects, the method includes, with the system in the second state: using the system to flow fluid from the device to the central passage via the third port and from the central passage to the subject via the first port, or using the system to flow fluid from the subject to the central passage via the first port and from the central passage to the device via the third port.

In another aspect, the present disclosure provides a method of directing a fluid between a subject and a device using a system of any of the aspects above. The method may include: connecting the first port to the subject via the first channel; and setting the system to the second state. Setting the system to the second state may include connecting the third port to the device defining the third channel via the third port. The method may include, with the system in the second state: using the system to flow fluid from the device to the central passage via the third port and from the central passage to the subject via the first port, or using the system to flow fluid flows from the subject to the central passage via the first port and from the central passage to the device via the third port.

In some aspects, the first port may be connected to a bladder of the subject via the first channel. In some aspects, the fluid from the subject may include a bodily fluid. In some aspects, the bodily fluid comprises urine. In some aspects, the fluid to the subject may include nutrition or a therapeutic or diagnostic agent.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting aspects of the present invention. In the drawings, like reference numbers indicate identical or functionally similar elements.

The figures herein are for illustrative purposes only and are not necessarily drawn to scale.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or aspects so described and illustrated.

In one aspect, the present disclosure provides systems and methods for controlling the direction of a fluid flow, e.g., from one container to another container, from a container to a subject, or from a subject to a container. In general, the systems may allow a single action to engage the systems, and/or easy and accurate selection of the channel to direct fluid flow in a desired direction. In some aspects, the systems may transition between different states or operation modes without the need of disconnecting the systems from any channel connected thereto. In some aspects, the systems may be configured to prevent debris or clots from hindering the operation of the systems, or contaminating the fluid or sample passing through the systems. In some aspects, the systems may include one or a set of springs that are not exposed to the fluid flow in the systems to avoid cross-contamination between the spring(s) and the fluid. In some alternative aspects, instead of one or more springs, the systems may include an elastic flange, and a periphery of the elastic flange may be fixed to a body of the system.

Figure 1:
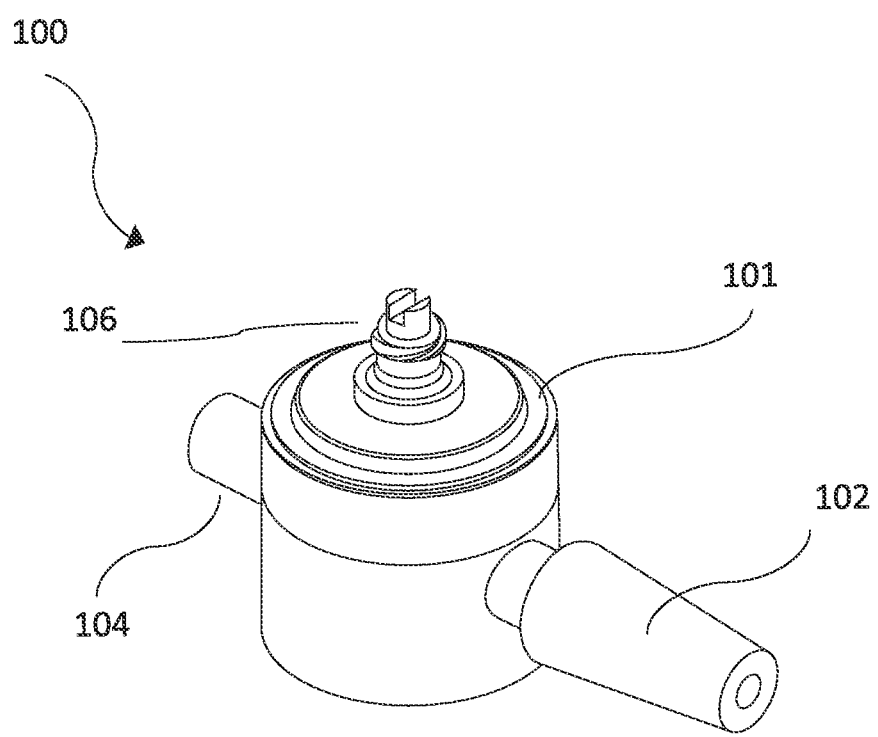
FIG. 1 illustrates a perspective view of an exemplary system for controlling fluid flow according to some aspects.

FIG. 1 shows an exemplary system 100 for directing fluid flow. As used herein, the term 'fluid' may include both liquids and gases. The system 100 may include a first port 102, a second port 104, and a third port 106. The first port 102 may be configured to be coupled to a first channel. The second port 104 may be configured to be coupled to a second channel. The third port 106 may be configured to be coupled to a third channel. Each of the first, second, third channels may be fluidically connected to a container or a subject. For example, the first port 102 may be coupled to a first channel, such as a catheter, that extends to a portion of a patient's body. The second port 104 may be coupled to a second channel, such as a drainage tube, which may receive fluid from a subject's body. The fluid from the subject's body may be a bodily fluid such as, for example and without limitation, urine, amniotic fluid, aqueous humour, vitreous humour, bile, blood, blood serum, breast milk, cerebrospinal fluid, cerumen (earwax), chyle, chyme, endolymph, perilymph, exudates, feces, male ejaculate, female secretions, gastric acid, gastric juice, lymph, mucus (including nasal drainage and phlegm), pericardial fluid, peritoneal fluid, pleural fluid, pus, rheum, saliva, sebum (skin oil), semen, sputum, synovial fluid, sweat, tears, vaginal secretion, vomit, or other bodily fluid, or a mixture thereof. The third port 106 may be coupled to a third channel, e.g., defined by a device, such as a syringe or another fluid delivery device such as a feeding tube or an IV bag with a connector, which may selectively administer or collect fluids. The system may include a body 101 disposed between the first port 102, the second port 104, and the third port 106.

Figure 2:
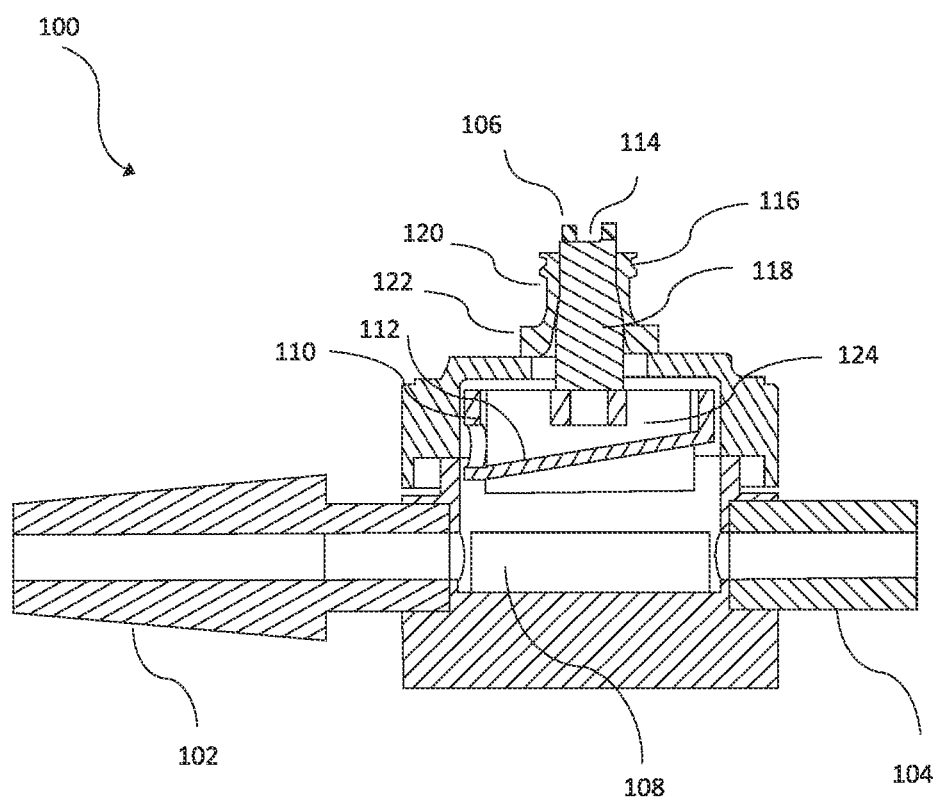
FIGS. 2 and 3 illustrate cross-sectional views of an exemplary system in first and second states, respectively, according to some aspects.

FIG. 2 shows a cross-sectional view of system 100. The system 100 may include a valve, which may include a member 110 and a stem 118. The body 101 of the system 100 may include a central passage 108, which may connect the first port 102, the second port 104, and the third port 106 such that fluid may flow therebetween. The system 100 may define a first fluid path between the first port 102 and the third port 106. The system 100 may further define a second fluid path between the first port 102 and the second port 104. As described herein, the system 100 may selectively transition between a first state (shown in FIG. 2) in which the valve in a first position blocks the first fluid path defined between the first port 102 and the third port 106, and a second state (shown in FIG. 3) in which the valve in a second position blocks the second fluid path defined between the first port 102 and the second port 104. In some aspects, this transition may occur when a male fitting of a device (e.g., a syringe) is inserted into a female fitting 114 of the third port 106. The transition may be caused manually or automatically.

The third port 106 may include a female fitting 114, which may be sized and shaped to receive a male fitting of a device to which the third port 106 may be coupled. In some aspects, the female fitting 114 may be a female fitting of a sealing taper. In some aspects, the male fitting of the device may be a male fitting of a sealing taper. In some aspects, the male fitting of the device may be a male fitting of a syringe. In some aspects, the third port may include a thread 116. The thread 116 may be configured to engage a complementary thread on a device (e.g., a syringe). For example, the female fitting 114 and thread 116 may together define a female portion of a sealing lock, which may be configured to engage a male portion of a Luer lock of a device.

The third port 106 may include a first portion 120 with a first diameter and a second portion 122 with a second diameter greater than the first diameter. In some aspects, the first portion 120 may have a diameter sized to engage a male fitting of a sealing taper. A shoulder of third port 106 may be defined at a transition from the first portion 120 and the second portion 122. In some aspects, the third port 106 may be configured to connect with a syringe. For example, the first portion 120 may have a diameter seized to engage a male fitting of a syringe. e.g., a male portion of a Luer lock of the syringe.

Figure 3:
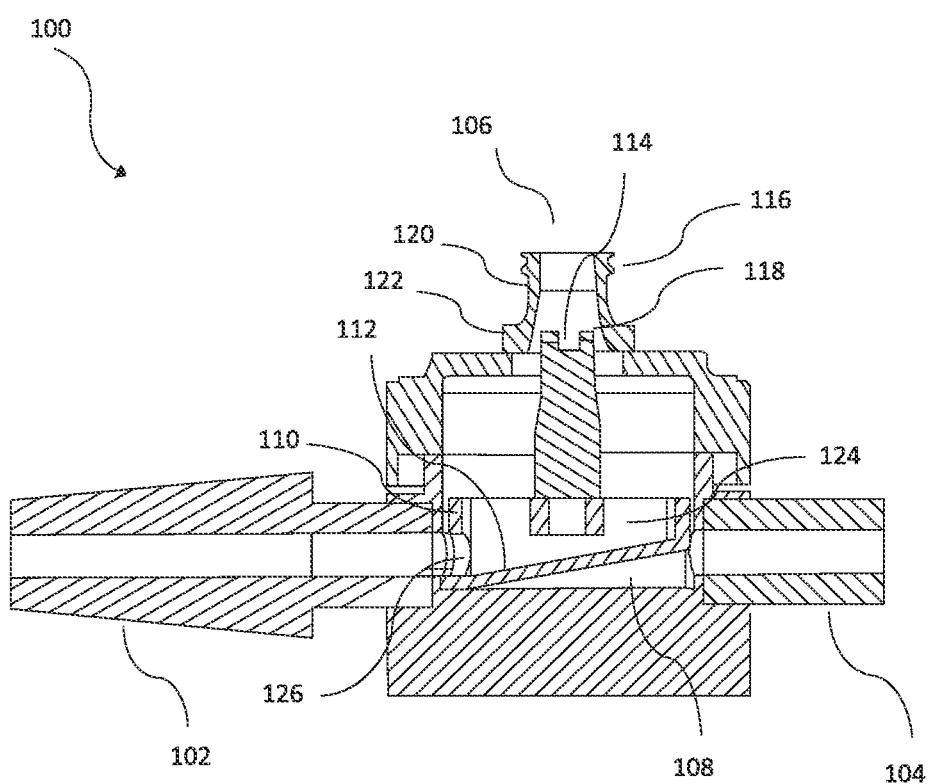

By inserting a male fitting of a device into the female fitting 114 of the third port 106, the system may be caused to transition to a second state, which is shown in FIG. 3. Specifically, the male fitting may press the member 110 downwardly (in the orientation shown in FIGS. 2 and 3) so that the member 110 extends at least partially into or further into the central passage 108. This may cause the member 110 to block the second flow path between the first port 102 and the second port 104. It may also cause an opening 126 of the member 110 to align with a passage through the first port 102 such that fluid may flow between the first port 102 and a channel 124 defined within the member 110. To ensure alignment, the member 110 and body 101 may include complementary grooves, fittings, or other alignment arrangements, that may run vertically and ensure that opening 126 aligns properly with the channel of port 102 when the system 100 is in the second state (shown in FIG. 3).

Figure 7:
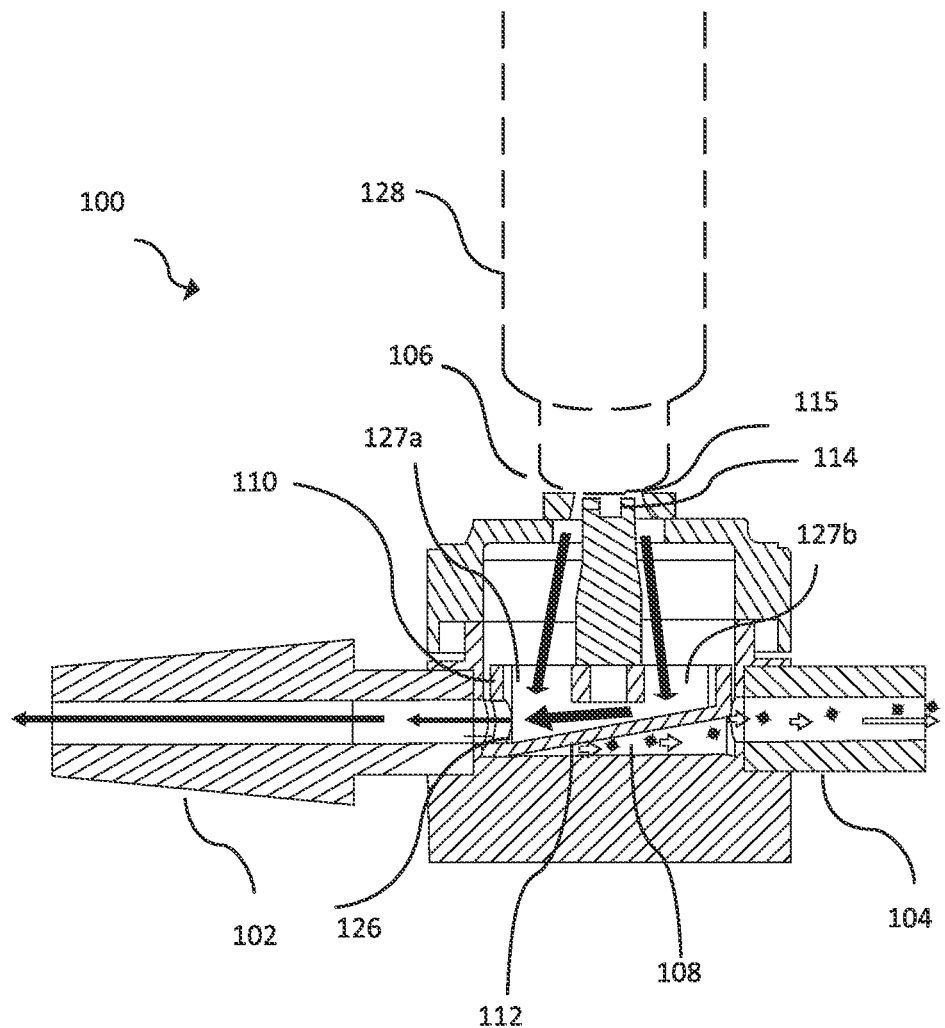
FIG. 7 illustrates fluid flow controlled by the exemplary system in the second state as shown in FIG. 3 to flush a fluid from the third port to the second port according to some aspects.
Figure 8:
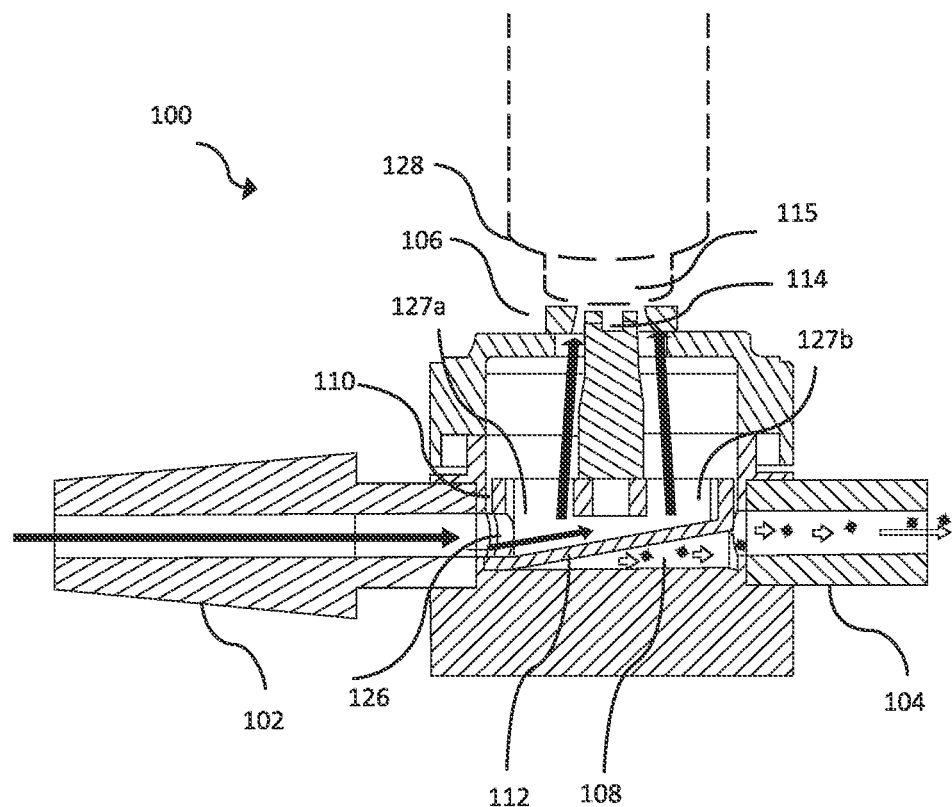
FIG. 8 illustrates another fluid flow controlled by the exemplary system in the second state as shown in FIG. 3 to aspirate a fluid from the second port to the third port according to some aspects.

In some aspects, a releasable locking member may be provided to releasably maintain the system in the second state in the event that the male fitting of the device is inadvertently detached from the female fitting 114 of the second port. So arranged, the system 100 may transition from the second state to the first state when the male fitting is removed and the locking mechanism is released. The member 110 may be arranged such that when the system 100 is in the second state, fluid may flow from the first port 102, the opening 126 on the side of the member 110, the openings 127a and 127b on the upper side of the member 110, and out of the third port 106. Fluid may likewise flow through the same components in the opposite direction (from the third port 106, openings 127a and 127b on the upper side of the member 110, the opening 126 on the side of the member 110, and out of the first port 102). Exemplary flow directions are shown in FIGS. 7 and 8.

The dimensions and positions of the member 110 and body 101 may be selected such that fully inserting a male fitting of a standardized size (e.g., a Luer taper) into the female fitting 114 causes (e.g., automatically) the valve to transition from its first position in the first state to its second position in the second state, thereby switching the system's open path from the second fluid path (between the first port 102 and the second port 104) to the first fluid path (between the first port 102 and the third port 106).

Removing the male fitting from the female fitting 108 may cause the system 100 to transition (e.g., automatically) from the second state to the first state. For example, the biasing force of spring may cause the valve (e.g., the member 110 of the valve) to return from the second position to the first position when the male fitting of the device is removed from female fitting 108. The configurations of the springs and related parts in system 100 may be those shown in FIGS. 9A-17B. A spring may be an elastic mechanical object that stores mechanical energy. Examples of the springs include flat springs fixed at one or both end (e.g., cantilever springs), coil springs (e.g., helical springs, tension springs, compression springs, hollow tubing springs), arc springs, volute springs, balance springs, leaf springs, v-springs, Belleville washers, constant-force springs, gas springs, main springs, negator springs, spring washers, torsion springs, wave springs, and a spring-like device (e.g., a device that stores elastic potential energy). In one example, the spring may be a coil spring.

In some aspects, the member 110 may have a slant lower surface 112 defining the lower boundary of the member 110 (e.g., in a position opposite the third port 106). When the system 100 transitions from the first state to the second state, the slant lower surface 112 of the member 110 is configured to push a substance from the central passage 108 to the second port 104, and out of the system 100. The substance may be solids or semi-solids such as debris and/or clots in the central passage 108. The debris or clots may be from or derived from a fluid passing through the system 100 when the system 100 is in the first state. The slant lower surface 112 can push the debris and clots out of the system 100 to ensure that the valve (e.g., the member 110 of the valve) can be moved down to the second position, which may allow proper alignment of the first port 102 and an opening (e.g., the opening 126) of the member 110, such that fluid can flow between the first port 102 and the third port 106 without interruption.

Figure 4:
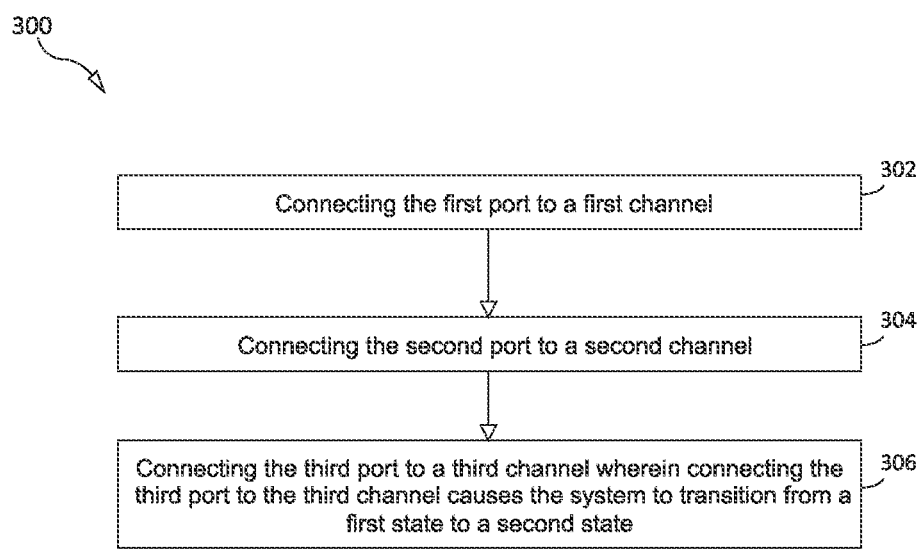
FIG. 4 is a flowchart illustrating an exemplary method of controlling fluid flow according to some aspects.

FIG. 4 shows an exemplary method 300 for directing fluid flow. In some aspects, method 300 may be performed using a system such as system 100, system 200, system 400, system 500, or system 600 as describe herein. For example, method 300 may be performed using a system that includes a first port, a second port, a third port, a body including a central passage, and a valve. In some aspects, the third port may include a female fitting. The first port, the second port, and the third port may be connected to each other via the central passage. In step 302, the first port may be connected to a first channel. In step 304, the second port may be connected to a third channel. In step 306, the third port may be connected to a third channel. In some aspects, the step of connecting the third port to the third channel may cause the system to transition from a first state to a second state, as described above with respect to FIGS. 2-3 and 9A-17B and below with respect to FIGS. 18C-18J. For example, in the first state, a male fitting of a device defining the third channel may be not inserted in the female fitting of the third port, and the valve may block a first fluid path defined between the first port and the third port. In the second state, the male fitting of the device defining the third channel may be fully inserted in the female fitting of the third port, and the valve may block a second fluid path defined between the first port and the second port. In some aspects, as shown in FIGS. 2, 5, 9A, 10A, 11A, 12A, 13A, 16A, 17A, 18C, 18D, 18G, and 18H, the valve is configured to be in a first position if the system is in the first state, and, as shown in FIG. 3, 7, 8, 9B, 10B, 11B, 12B, 13B, 16B, 17B, 18E, 18F, 18I, and 18J, the valve is configured to be in a second position if the system is in the second state.

In some aspects, the male fitting of the device defining the third channel is a male fitting of a Luer taper. For example, the device defining the third channel may be a syringe having a male fitting of a Luer taper, such that the syringe may easily connect to devices with corresponding female fittings.

In some aspects, the valve may include a member that is at least partially disposed in the third port when the system is in the first state, and the step 306 of connecting the third port to the third channel may include inserting the male fitting of the device into the female fitting of the third port, thereby causing the member to extend at least partially into or further into the passage (e.g., as described above with respect to FIGS. 2-3 and 9A-17B). In some aspects, the system may be in the first state before the step 306 of connecting the third port to the third channel. In this state, a spring (or an elastic flange) may bias the member such that the member is at least partially disposed in the third port. In some aspects, the third port may include a first portion having a first diameter sized to engage a male fitting of a sealing taper such as Luer lock, and a second portion having a second diameter that is greater than the first diameter.

In some aspects, the member may include one or more flanges. When the system is in the first state, a first surface of the one or more flanges may engage a shoulder of the third port, and a second surface of the one or more flanges may engage a spring. The spring may bias the member such that the member is at least partially disposed in the third port when the system is in the first state. In some aspects, the system may comprise one or more springs as shown in FIGS. 9A to 17B or an elastic flange as shown in FIGS. 18C-18J. For examples, the one or more springs or the elastic flange may bias the valve (e.g., a member of the valve) toward a first position of the valve in the first state. In some aspects including one or more springs, the spring(s) may be positioned such that they are not exposed to the fluid flowing through the system. For example, the spring(s) may be completely separated from the fluid flow at any time.

In some aspects, the step 306 of connecting the third port to the third channel, thereby transitioning the system from the first state to the second state, may cause the member to block the second fluid path defined between the first port and the second port, as described above with respect to FIGS. 2-3, 9A-17B (and below with respect to FIGS. 18C-18J). The system may be configured such that when the system is in the second state, fluid may flow from the first port, into the first opening(s) of the member (e.g., member 110, 410, 510, or 610), through the channel (e.g., channel 124, 424, 524, or 624) of the member, out of the second opening(s) of the member, and out of the third port (e.g., as shown in FIG. 8). In certain examples, when the system is in the second state, fluid may flow in another direction, e.g., from the third port, into the second openings of the member, through the channel of the member, out of the first opening(s) of the member, and out of the first port (e.g., as shown in FIG. 7).

The method 300 may further comprise pushing a substance from the central passage to the second port by the slant lower surface of the member when the system transitions from the first state to the second state. The substance may be solids or semi-solids such as debris and/or clots sin the central passage. The substance (e.g., debris and/or clots) may be pushed out of the system to ensure that the valve (e.g., the member of the valve) can be moved down to the second position, which may allow proper alignment of the first port and an opening (e.g., the opening) of the member, such that fluid can flow between the first port and the third port without interruption. In some examples, the method 300 may comprise cleaning the system by pushing substances out of the central passage out by the slant lower surface of the member.

An exemplary method of using the system to direct a fluid between a subject and a container may comprise connecting the first port to the subject via the first channel; connecting the second port to a container via the second channel; setting the system to the first state such that: the fluid flows from the subject to the central passage via the first port and from the central passage to the container via the second port, or the fluid flows from the container to the central passage via the second port and from the central passage to the subject via the first port. In some aspects, the first port may be fluidically connected to a subject, such as a cavity, an organ, or a tissue containing a fluid (e.g., the bladder) of the subject.

Figure 5:
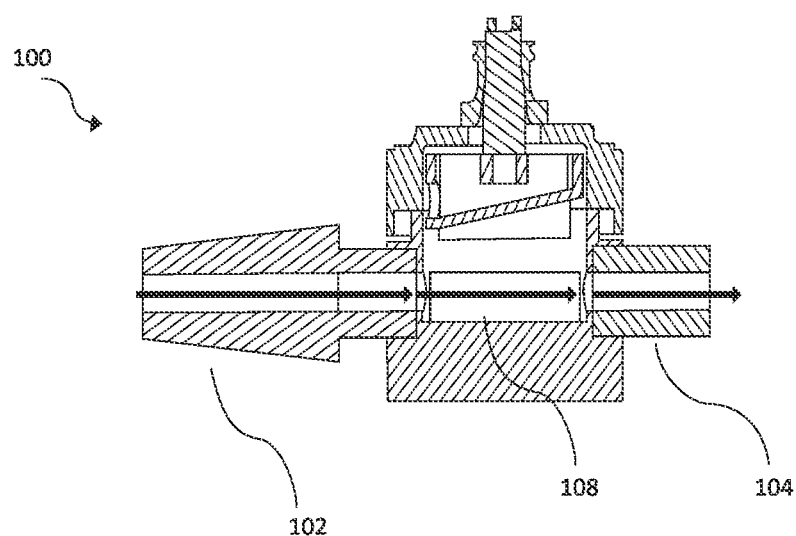
FIG. 5 illustrates fluid flow controlled by the exemplary system in the first state as shown in FIG. 2 according to some aspects.

FIG. 5 shows an exemplary fluid flow controlled with the method in the system 100. In some aspects, the system 100 may be set to the first state such that the fluid flows from the subject to the central passage 108 via the first port 102 and from the central passage 108 to the container via the second port 104.

Figure 6:
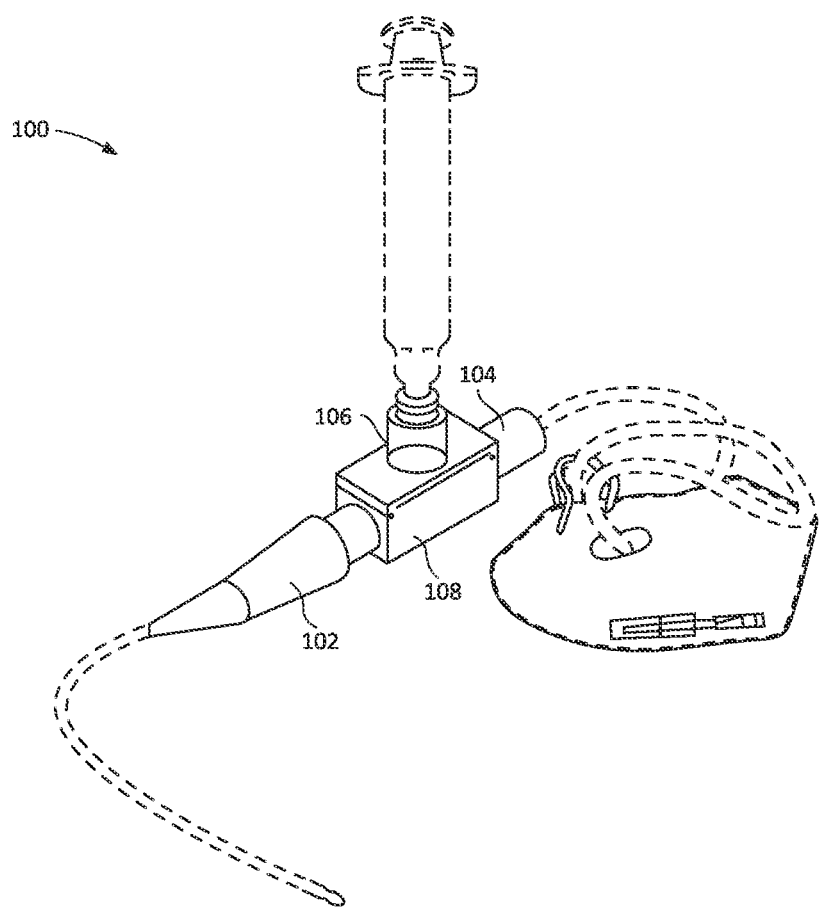
FIG. 6 illustrates an exemplary system for collecting urine from a subject's bladder according to some aspects.

FIG. 6 shows an exemplary system 200 for draining urine from a subject using the system 100 as described in FIG. 5. The system 200 may comprise a catheter 204 (e.g., a Foley catheter), a draining port 206, a fluid flow control system 208, a drainage tubing 210, and a urine collecting bag 212. The subject bladder 202 may be fluidically connected with the urine-collecting bag 212 via the catheter 204, the draining port 206, and the fluid flow control system 208, and the drainage tubing 210. Although FIG. 6 illustrates the fluid flow control system 208 as part of a urinary system, this is not required, and, in some alternative aspects, the fluid flow control system 208 may be used as part of different systems (e.g., in a feeding tube and/or infusion system).

In certain aspects, the system 100 may be set to the first state so that the fluid flows from the container to the central passage 108 via the second port 104 and from the central passage 108 to the subject via the first port 102. In some examples, the system 100 may be set to the first state to direct fluid flow between two containers (e.g., one container coupled to the first port 102 and the other coupled to the second port 104).

Another exemplary method of using the system 100 to direct a fluid between a subject and a container may comprise connecting the first port 102 to the subject via the first channel; connecting the third port 106 to a device 128 defining the third channel via the third port 106; setting the system 100 to the second state such that: the fluid flows from the device 128 to the central passage 108 via the third port 106 and from the central passage 108 to the subject via the first port 102, or the fluid flows from the subject to the central passage 108 via the first port 102 and from the central passage 108 to the device via the third port 106.

FIG. 7 shows an aspect of using the system 100 to direct fluid flow from the third port 106 to the first port 102 via the central passage 108. In this aspect, the system 100 may be used to administer a fluid from a device 128 connected to the third port 106 (e.g., a syringe) to a portion of the subject fluidically connected to the first port 102. For example, a solution (e.g., a solution with nutrition and/or a therapeutic and/or diagnostic agent(s)) may be injected to the subject. In some aspects, the method 300 may further comprise setting the system 100 to the second state such that the fluid flows from the device 128 to the central passage 108 via the third port 106 and from the central passage 108 to the subject via the first port 102. For example, the fluid may flow from the device 128 into the third port 106, through the openings 127*a* and 127*b* on the top of the member 110, the channel 124, the opening 126 on the side of the member 110, and to the port 102.

FIG. 8 shows an aspect of the system 100 in directing fluid flow from the first port 102 to the third port 106 via the central passage 108. In this application, the system 100 may be used to withdraw a fluid from a portion of a subject fluidically connected to the first port 102 to a device 128 connected to the third port 106 (e.g., a syringe). For example, a sample (e.g., a bodily fluid) may be withdrawn from the subject via the system 100. In some aspects, the method 300 may further comprise setting the system to the second state such that the fluid flows from subject to the central passage 108 via the first port 102 and from the central passage 108 to the device via the third port 106. For example, the fluid may flow from the first port 102 through the opening 126 on the side of the member, the channel 124, the openings 127*a* and 127*b* on the top of the member 110, to the third port 106, and then to the device 128).

As shown in FIGS. 7 and 8, when the system 100 is in the second state, substances (e.g., debris and/or clots) in the portion of the central passage 108 under the member 110 may be pushed out the system 100 via the second port 104 by the slant lower surface 112 of the member 110. In such cases, the valve (e.g., the member 110 of the valve) may be pushed down to the second position in which openings of the member 110 and the first port 102 may be properly aligned to ensure the flow path between the first port 102 and the third port 106 is uninterrupted.

FIGS. 9A-15 show another exemplary system 400 for controlling fluid flow. In some aspects, system 400 includes one or a set of springs to control the transition of the system between two states as described below. The spring(s) may be positioned such that they are not exposed to any fluid flow in the system to avoid cross-contamination between the fluid and the spring(s). As shown in FIGS. 9A-15, the system 400 may include a first port 402, a second port 404, and a third port 406. The first port 402 may be configured to be coupled to a first channel. The second port 404 may be configured to be coupled to a second channel. The third port 406 may be configured to be coupled to a third channel. Each of the first, second, and third channels may be fluidically connected to a container or a subject. For example, the first port 402 may be coupled to a first channel, such as a catheter, that extends to a portion of a patient's body. The second port 404 may be coupled to a second channel, such as a drainage tube, which may receive fluid from a subject's body. The fluid from the subject's body may be a bodily fluid such as, for example and without limitation, urine, amniotic fluid, aqueous humour, vitreous humour, bile, blood, blood serum, breast milk, cerebrospinal fluid, cerumen (earwax), chyle, chyme, endolymph, perilymph, exudates, feces, male ejaculate, female secretions, gastric acid, gastric juice, lymph, mucus (including nasal drainage and phlegm), pericardial fluid, peritoneal fluid, pleural fluid, pus, rheum, saliva, sebum (skin oil), semen, sputum, synovial fluid, sweat, tears, vaginal secretion, vomit, or other bodily fluid, or a mixture thereof. The third port 406 may be coupled to a third channel, e.g., defined by a device, such as a syringe or another fluid delivery device such as a feeding tube or an IV bag with a connector, which may selectively administer or collect fluids. The system may include a body 401 disposed between the first port 402, the second port 404, and the third port 406.

FIGS. 9A-13B show cross-sectional views of system 400. The system 400 may include a valve, which may include a member 410 and a stem 418. The body 401 of the system 400 may include a central passage 408, which may connect the first port 402, the second port 404, and the third port 406 such that fluid may flow therebetween. The system 400 may define a first fluid path between the first port 402 and the third port 406. The system 400 may further define a second fluid path between the first port 402 and the second port 404. As described herein, the system 400 may selectively transition between a first state (shown in FIGS. 9A, 10A, 11A, 12A, and 13A) in which the valve is in a first position and blocks the first fluid path defined between the first port 402 and the third port 406, and a second state (shown in FIGS. 9B, 11B, 12B, and 13B) in which the valve is in a second position and blocks the second fluid path defined between the first port 402 and the second port 404. In some aspects, this transition may occur when a male fitting of a device (e.g., a syringe) is inserted into a female fitting 414 of the third port 406. The transition may be caused manually or automatically.

The third port 406 may include a female fitting 414, which may be sized and shaped to receive a male fitting of a device to which the third port 106 may be coupled. In some aspects, the female fitting 414 may be a female fitting of a sealing taper. In some aspects, the male fitting of the device may be a male fitting of a sealing taper. In some aspects, the male fitting of the device may be a male fitting of a syringe. In some aspects, the third port may include a thread 416. The thread 416 may be configured to engage a complementary thread on a device (e.g., a syringe). For example, the female fitting 414 and thread 416 may together define a female portion of a sealing lock, which may be configured to engage a male portion of a Luer lock of a device.

The third port 406 may include a first portion 420 with a first diameter and a second portion 422 with a second diameter greater than the first diameter. In some aspects, the first portion 420 may have a diameter sized to engage a male fitting of a sealing taper. A shoulder of port 406 may be defined at a transition from the first portion 420 and the second portion 422. In some aspects, the third port may be configured to connect with a syringe. For example, the first portion 420 may have a diameter seized to engage a male fitting of a syringe. e.g., a male portion of a Luer lock of the syringe.

By inserting a male fitting of a device into the female fitting 414 of the third port 406, the system may be caused to transition to a second state, which is shown in FIGS. 9B, 10B, 11B, 12B, and 13B. Specifically, the male fitting may press the member 410 downwardly (in the orientation shown in FIGS. 9A-13B) so that the member 410 extends at least partially into or further into the central passage 408. This may cause the member 410 to block the second flow path between the first port 402 and the second port 404. It may also cause an opening 426 of the member 410 to align with a passage through the first port 402 such that fluid may flow between the first port 402 and a channel 424 defined within the member 410. To ensure alignment, the member 410 and body 401 may include complementary grooves, fittings, or other alignment arrangements, that may run vertically and ensure that opening 426 aligns properly with the channel of port 402 when the system 100 is in the second state (shown in FIGS. 9B, 10B, 11B, 12B, and 13B).

In some aspects, a releasable locking member may be provided to releasably maintain the system in the second state in the event that the male fitting of the device is inadvertently detached from the female fitting 414 of the second port. So arranged, the system 400 may transition from the second state to the first state when the male fitting is removed and the locking mechanism is released. The member 410 may be arranged such that when the system 400 is in the second state, fluid may flow from the first port 402, the opening 426 on the side of the member 410, the openings 427a and 427b (see FIG. 15) on the upper side of the member 410, and out of the third port 406. Fluid may likewise flow through the same components in the opposite direction (from the third port 406, openings 427a and 427b on the upper side of the member 410, the opening 426 on the side of the member 410, and out of the first port 102).

The dimensions and positions of the member 410 and body 401 may be selected such that fully inserting a male fitting of a standardized size (e.g., a Luer taper) into the female fitting 414 causes the valve to transition from its first position in the first state to its second position in the second state, thereby switching the system's open path from the second fluid path (between the first port 402 and the second port 104) to the first fluid path (between the first port 402 and the third port 406).

Removing the male fitting from the female fitting 408 may cause the system 400 to transition (e.g., automatically) from the second state to the first state. For example, the biasing force of the springs may cause the valve (e.g., the member 410 of the valve) to return from the second position to the first position when the male fitting of the device is removed from female fitting 408.

Figure 9A:
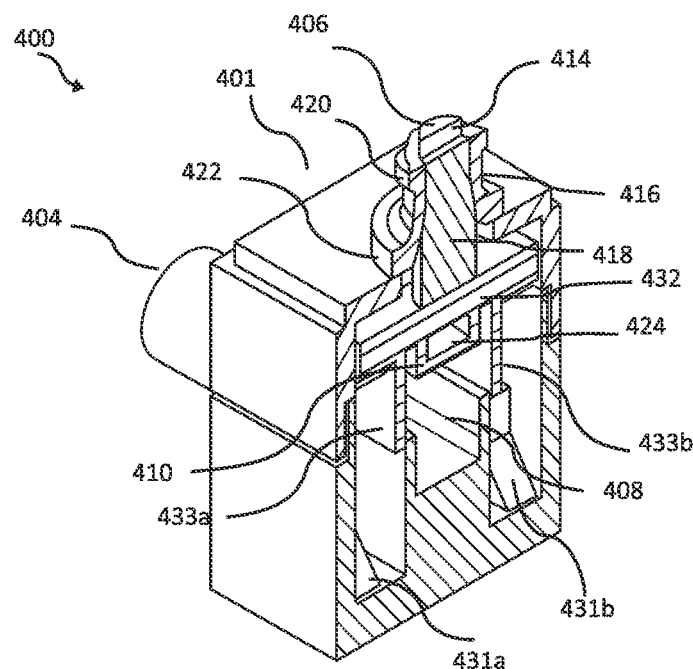
FIGS. 9A, 10A, 11A, 12A, and 13A illustrate cross-sectional views of another exemplary system in a first state according to some aspects.
Figure 9B:
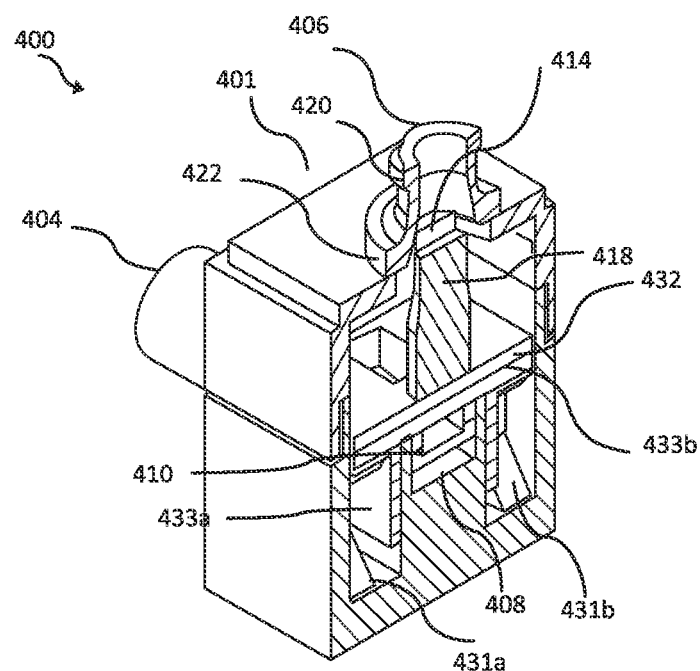
FIGS. 9B, 10B, 11B, 12B, and 13B illustrate cross-sectional views of the exemplary system in a second state according to some aspects.

The configurations of the springs and related parts are shown in FIGS. 9A-17B. FIGS. 9A and 9B show a cross-sectional view of the system 400. As shown in FIGS. 9A and 9B, the system 400 may include spring guides 431a and 431b for positioning the set of springs in the body 410 of the system 400. The spring guide may be configured to keep the spring attached to it straight during compression. The system 400 may further include separators 433a and 433b, each of which is between a spring and the member 410. The separators 433a and 433b may separate the springs from fluid flow in the system. Additionally or alternatively, the separators 433a and 433b may also guide the alignment of the member 410 and the central passage 408 when the system 400 transitions from the first state to the second state.

Figure 10A:
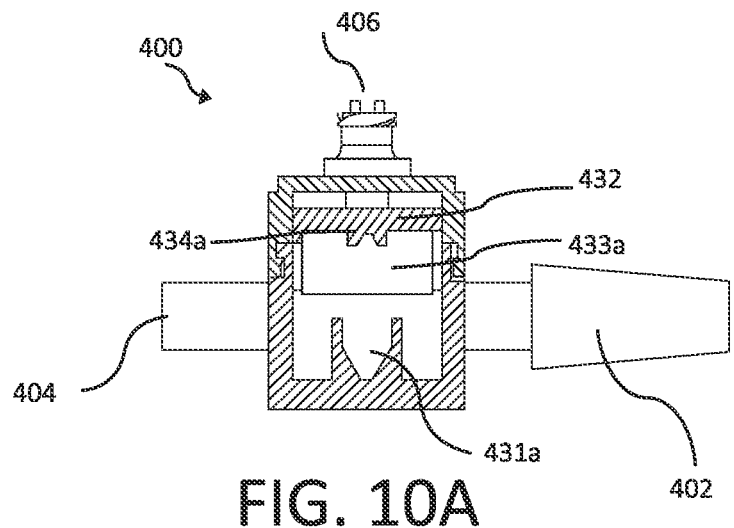

FIGS. 10A-11B show another cross-section of the system 400 along a plane between the separator 433a and the outer wall of the body 410. As shown in FIGS. 10A and 10B, the spring guide 431a is located between the separator 433a and the outer wall of the body 410. In some aspects, the system 400 may further include a flange 432 connected with the stem 418, and another spring guide 434a to position the spring 430a together with the separators 433a. The system 400 may include another set of spring guides (431b and another guide attached to the flange 432) to secure another spring on the other side of the body 410.

Figure 10B:
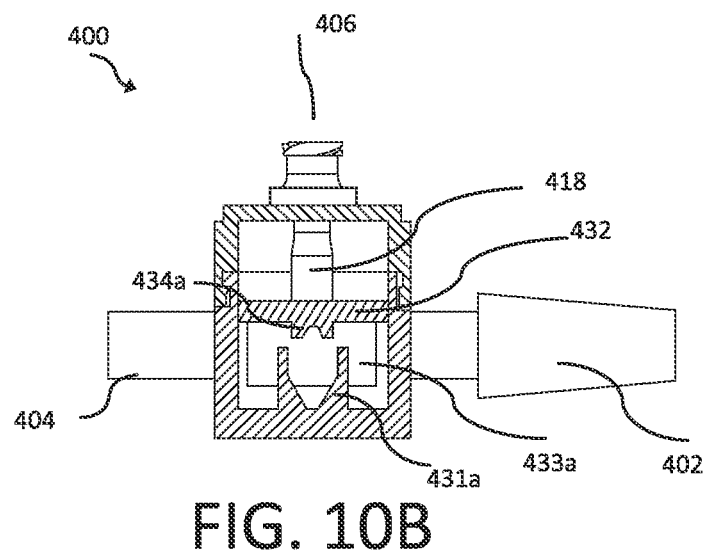
Figure 11A:
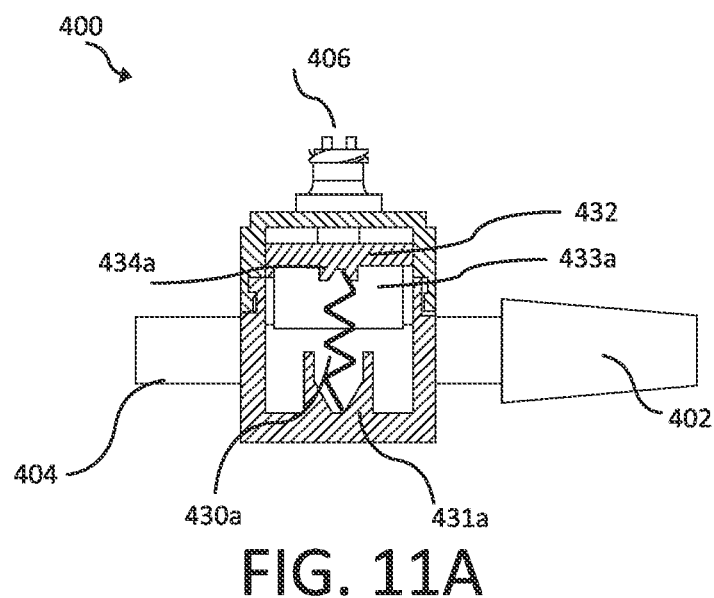
Figure 11B:
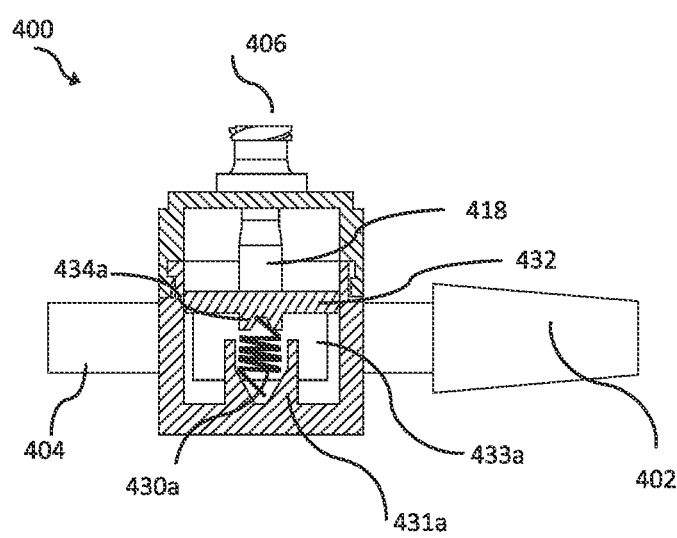
Figure 12A:
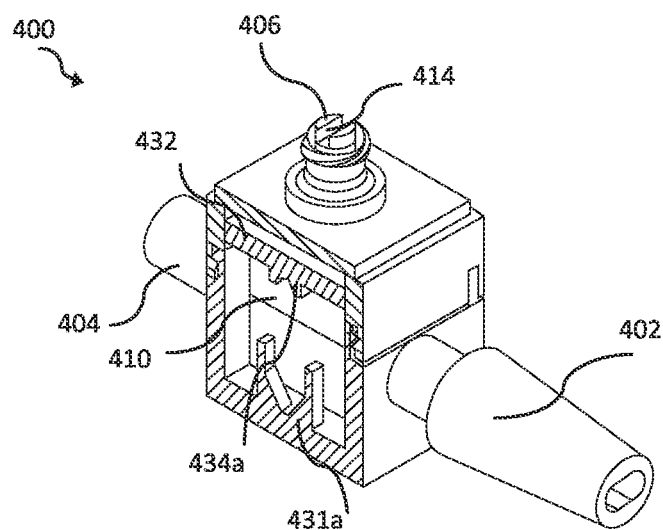
Figure 12B:
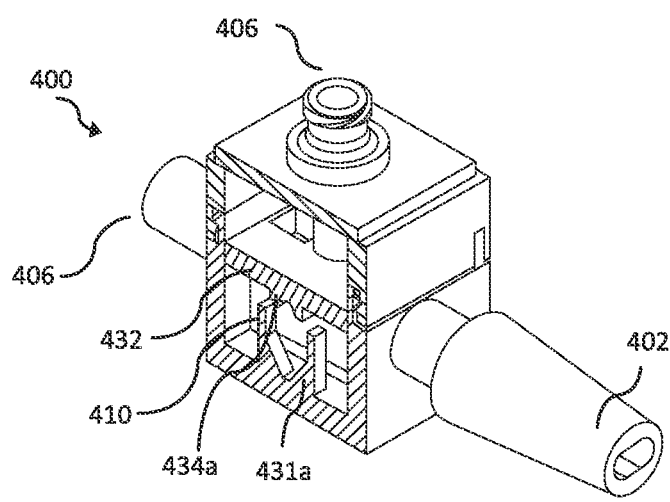

FIGS. 12A-12B show the cross-sectional views in FIGS. 10A-10B without showing the separators 433a and 433b. As shown in FIGS. 12A-12B, the spring guides 431a and 434a may be positioned such that they are not in touch with any fluid flow or the member 410. Thus, a spring positioned between the spring guides 431a and 434a may be completely separated, and not be exposed to, any fluid flow in the system 400. In some aspects, the spring may be positioned in the system 400 with only one or without any of the spring guides 431a or 434a.

Figure 13A:
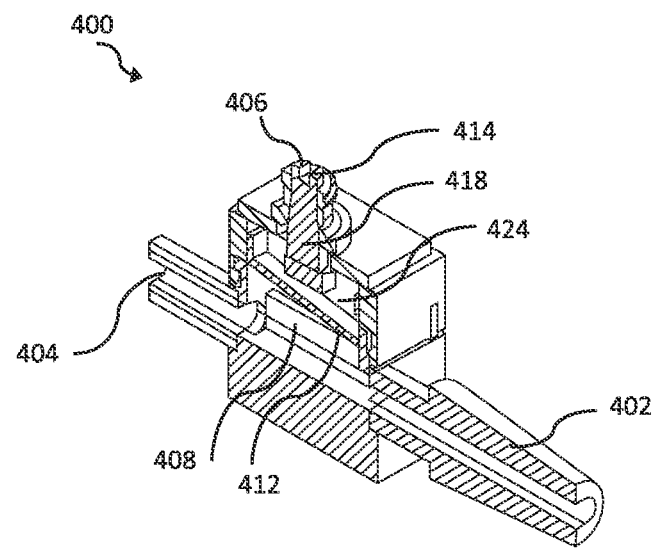
Figure 13B:
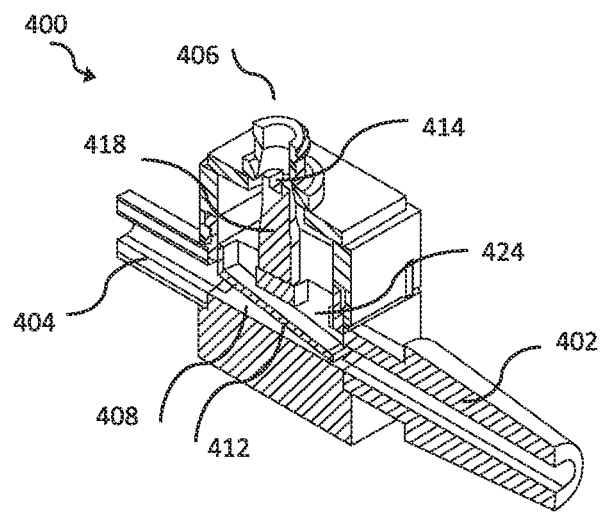

FIGS. 13A-13B show another cross-sectional view of the system 400 along a plane crossing the stem as shown in the figures, which shows the flow paths in the system 400 in the first state (FIG. 13A) and the second state (FIG. 13B). As shown in the figures, a fluid flowing through the flow paths is not in touch with any spring(s) or spring guide(s).

Figure 14:
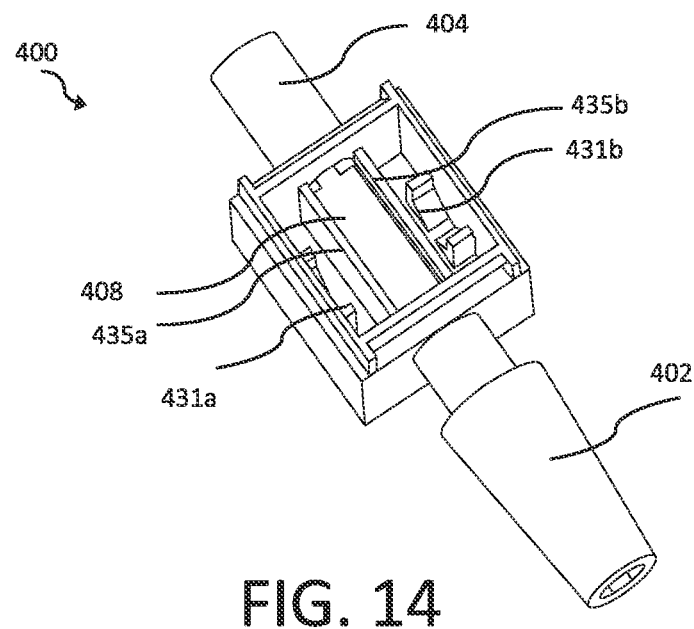
FIG. 14 illustrates a bottom portion of the exemplary system shown in FIGS. 9A-13B according to some aspects.

FIG. 14 shows the bottom section of the system 400. As shown in FIG. 14, the central passage 408 may have two rims 435a and 435b. In some aspects, the separators 433a and 433b may be configured to position between the spring guides 431a and 435a, and between the spring guide 431b and the rim 435b.

The springs in the system may be made of any suitable materials, e.g., silicone or metal (e.g., titanium). In some examples, the spring may be made of silicone (medical grade silicone).

Figure 15:
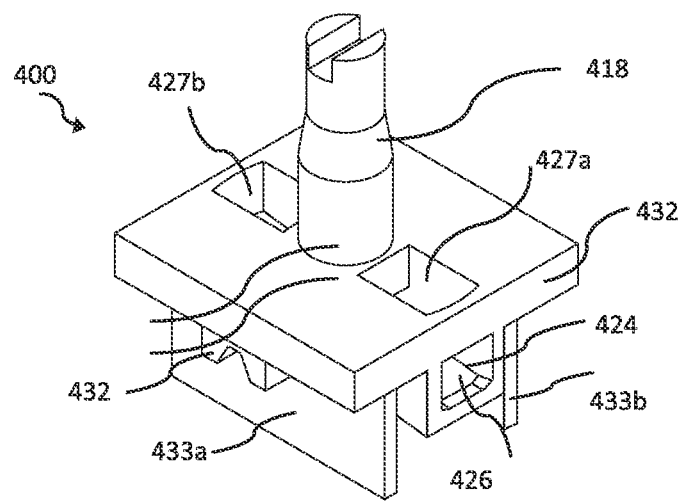
FIG. 15 illustrates openings on a member of the exemplary system shown in FIGS. 9A-13B according to some aspects.
Figure 16A:
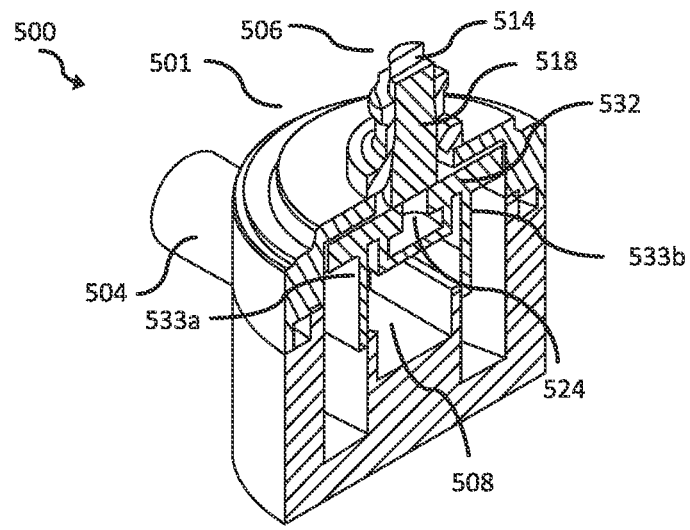
FIGS. 16A and 17A show cross-sectional views of another exemplary system in a first state according to some aspects.
Figure 16B:
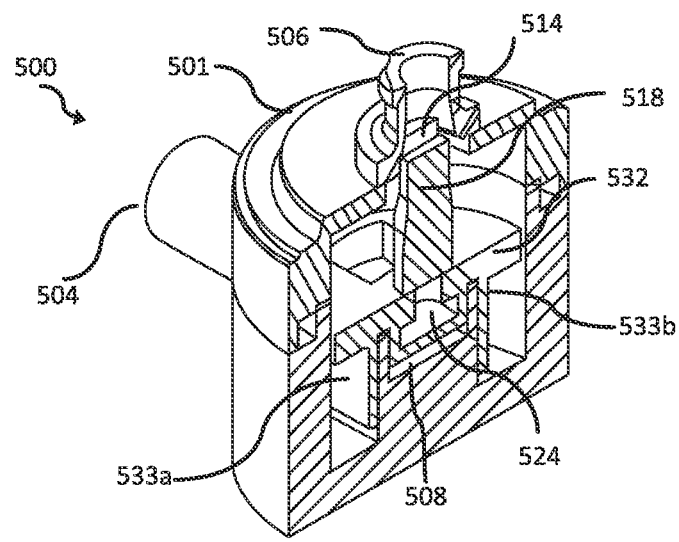
FIGS. 16B and 17B illustrate cross-sectional views of the exemplary system in a second state according to some aspects.
Figure 17A:
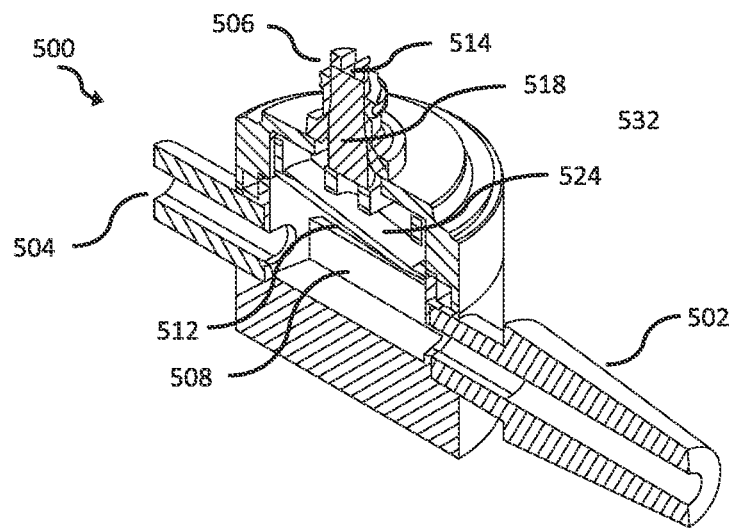
Figure 17B:
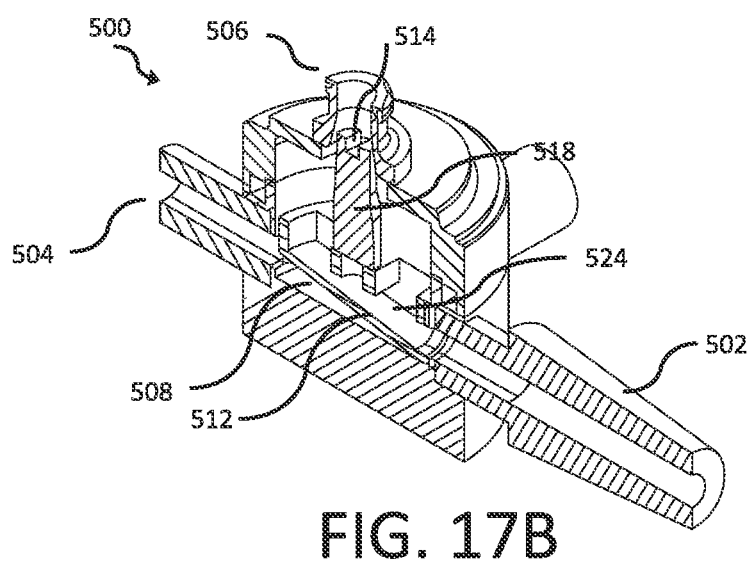
Figure 18A:
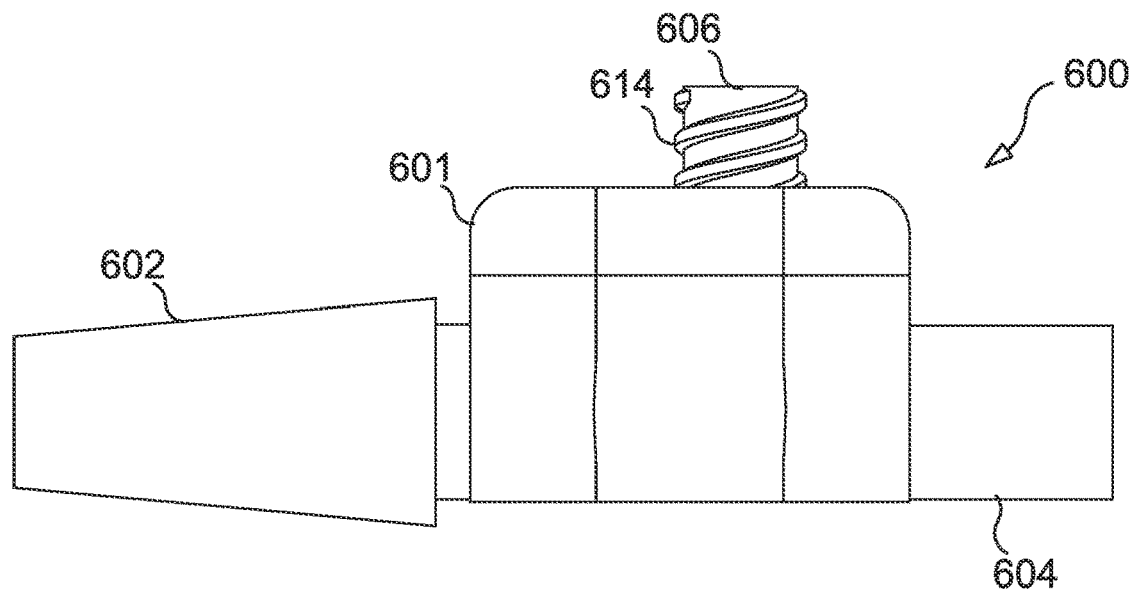
FIGS. 18A and 18B illustrate side and front views, respectively, of another exemplary system according to some aspects.
Figure 18B:
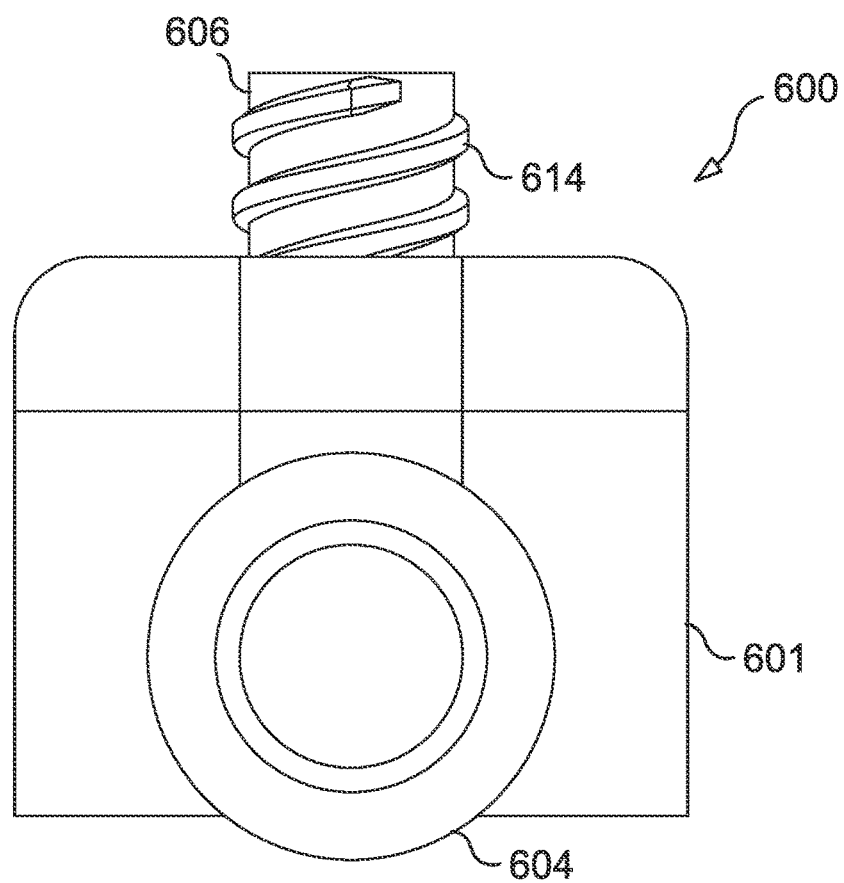
Figure 18C:
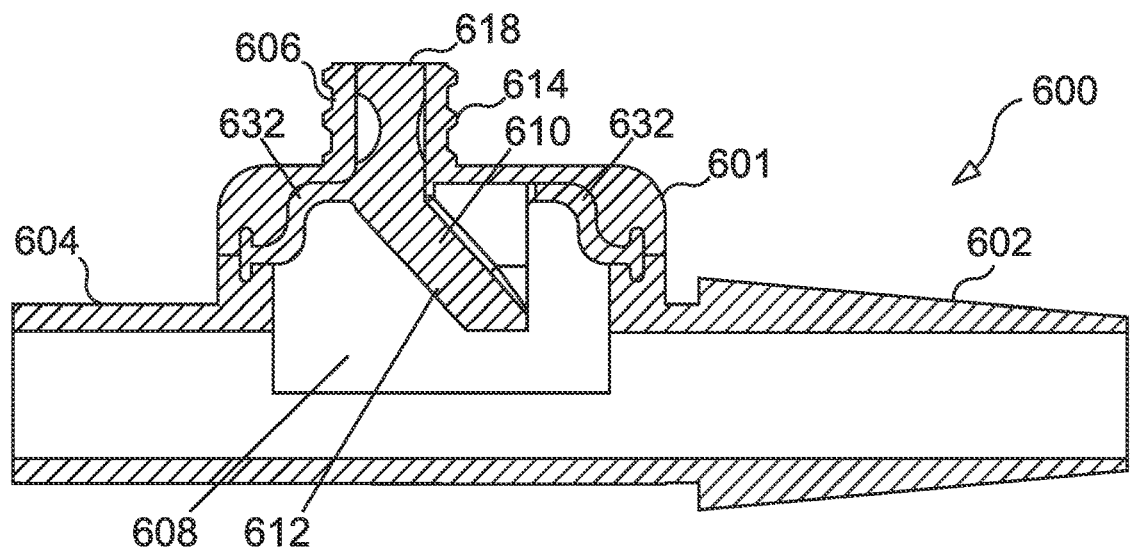
FIGS. 18C and 18D illustrate cross-sectional side and front views, respectively, of the exemplary system shown in FIGS. 18A and 18B in a first state according to some aspects.
Figure 18D:
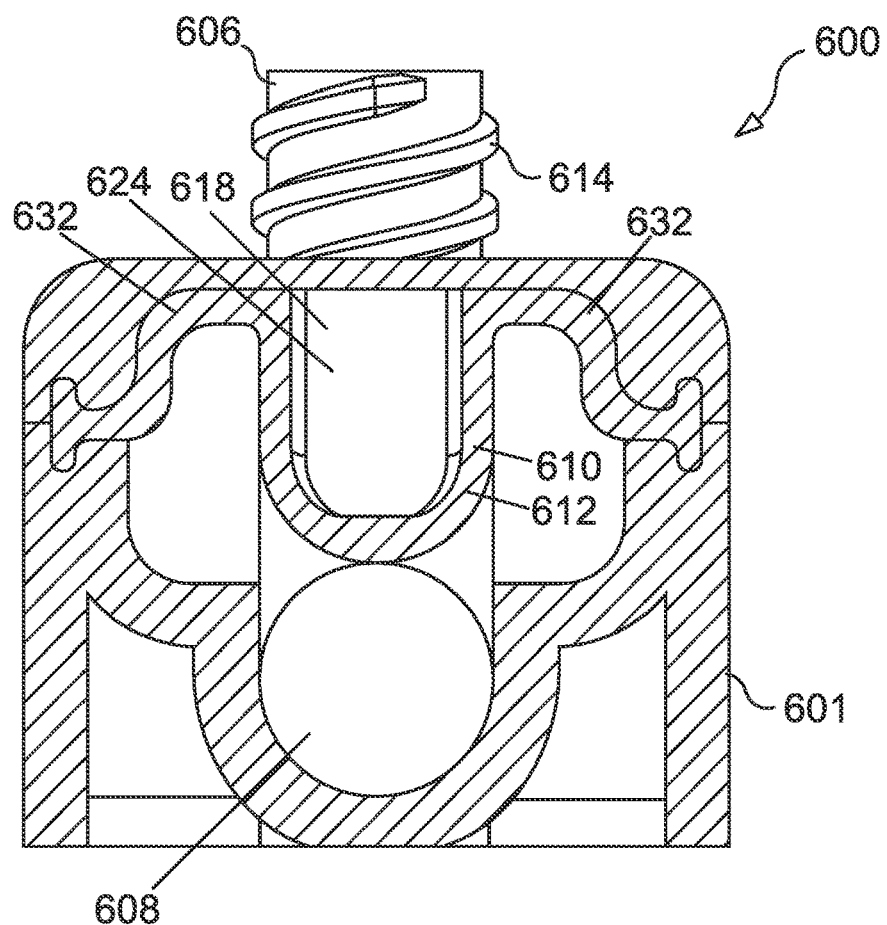
Figure 18E:
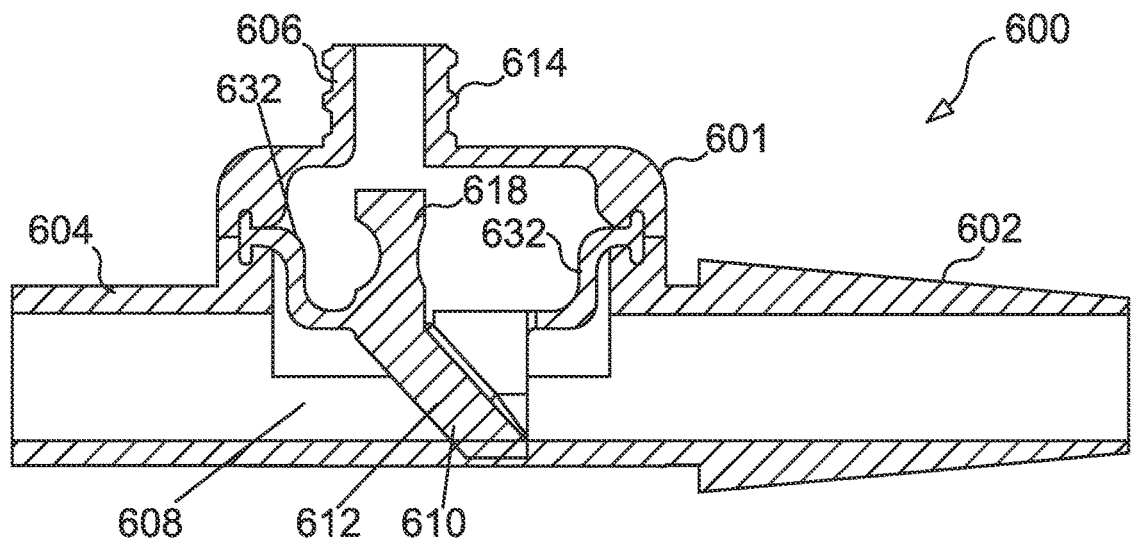
FIGS. 18E and 18F illustrate cross-sectional side and front views, respectively, of the exemplary system shown in FIGS. 18A and 18B in a second state according to some aspects.
Figure 18F:
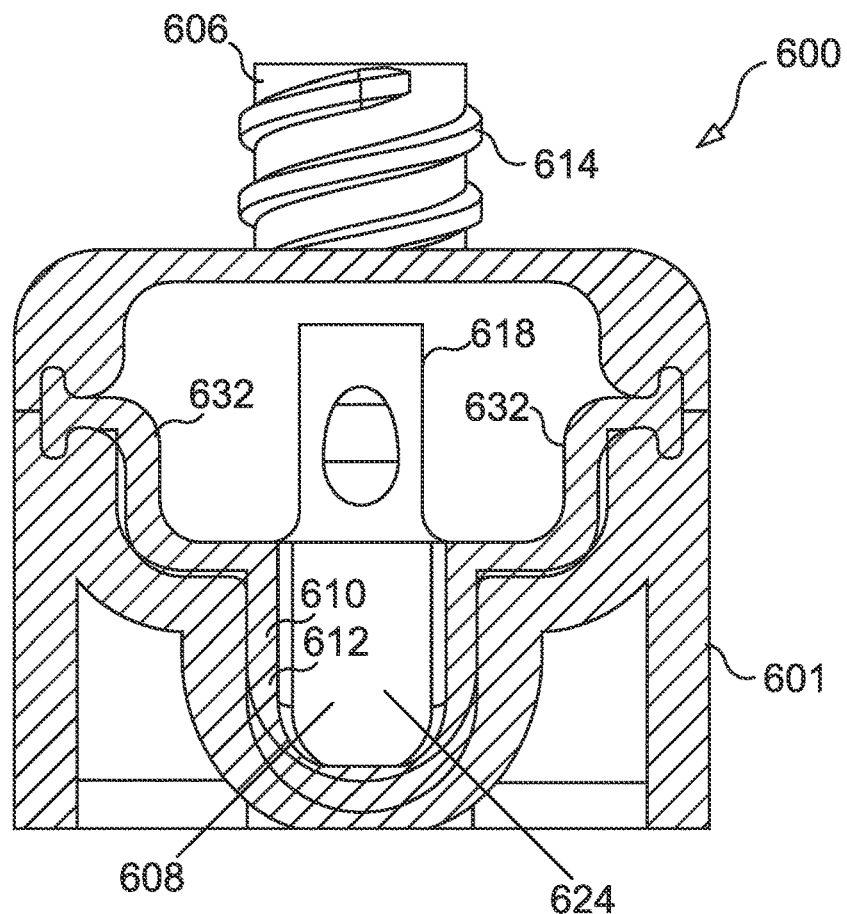
Figure 18G:
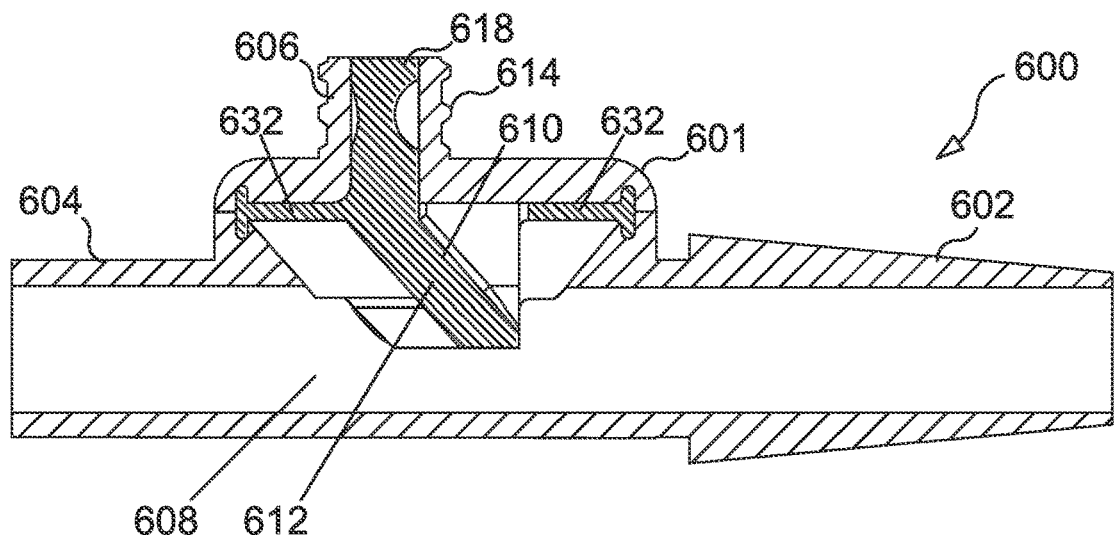
FIGS. 18G and 18H illustrate cross-sectional side and front views, respectively, of the exemplary system shown in FIGS. 18A and 18B in a first state according to some alternative aspects.
Figure 18H:
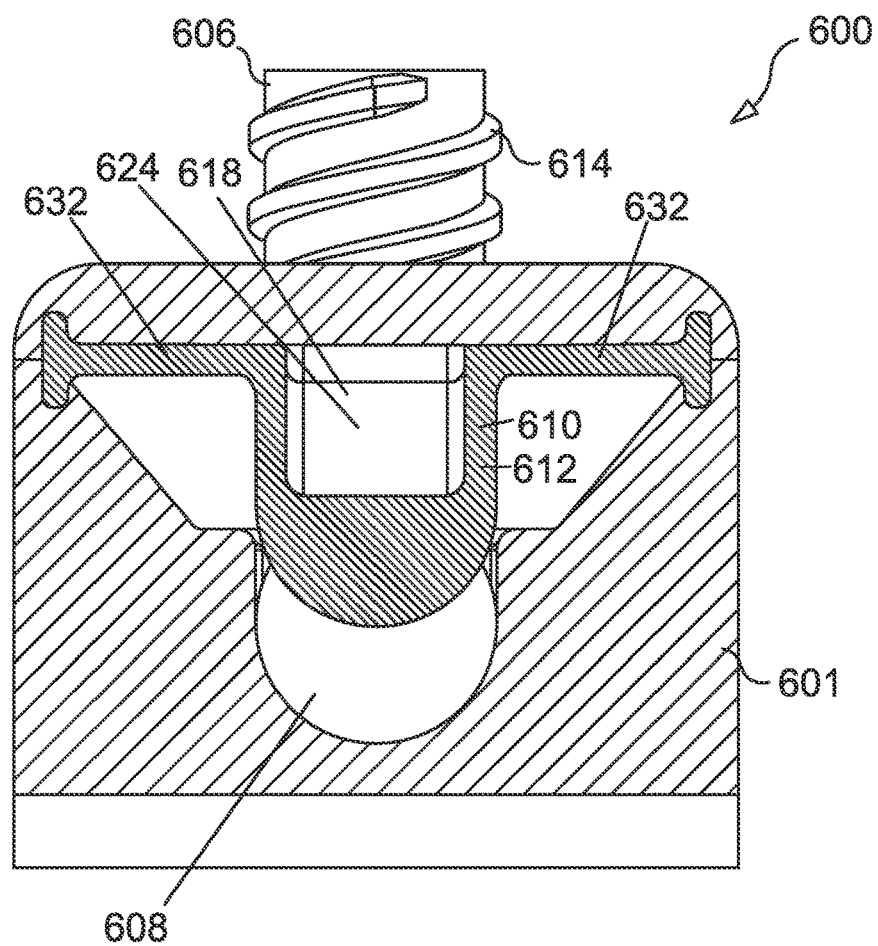
Figure 18I:
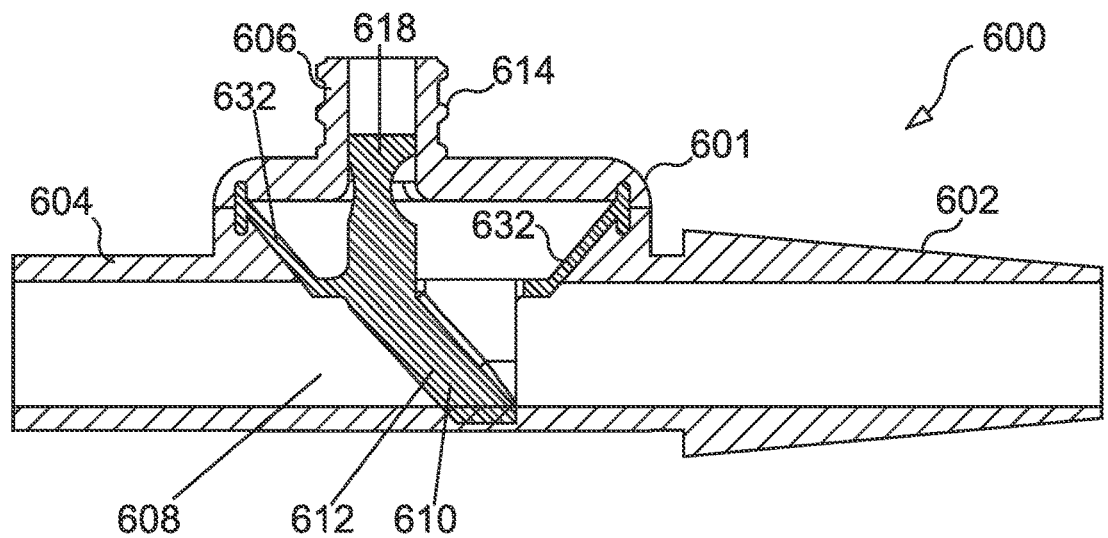
FIGS. 18I and 18J illustrate cross-sectional side and front views, respectively, of the exemplary system shown in FIGS. 18A and 18B in a second state according to some alternative aspects.
Figure 18J:
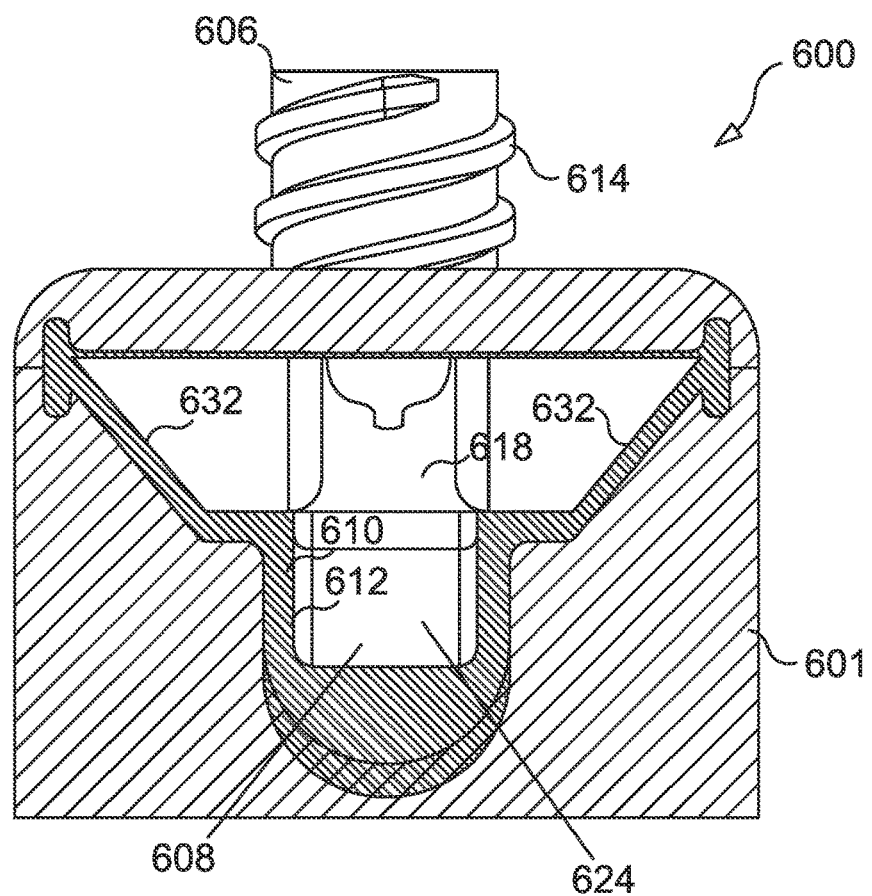

FIG. 15 shows the openings in the member of the system 400. As shown in FIG. 15, the member may include two openings 427a and 427b on the top of the member and an opening 426 at the side of the member. In some aspects, when the system is in the second state, the opening 426 may be aligned with the second port 404. In such cases, a fluid may be directed from the third port 406 into the channel 424 through the openings 427a and 427b, and out of the channel 424 and into the second port 404 through the opening 426. Alternatively, a fluid may be directed from the second port 404 into the channel 424 through the opening 426, and out of the channel 424 through the openings 427a and 427b, and into the third port 406.

In the system 400, the member 410 may have a slant lower surface 412 defining the lower boundary of the member 410 (e.g., in a position opposite the third port 406). When the system 400 transitions from the first state to the second state, the slant lower surface 412 of the member 410 is configured to push a substance from the central passage 408 to the second port 404. The substance may be solids or semi-solids such as debris and/or clots in the central passage 408. The debris or clots may be from or derived from a fluid passing through the system 400 when the system 400 is in the first state. The slant lower surface 412 can push the debris and clots out of the system 400 to ensure that the member 410 can be moved down from the first position to the second position, which may allow proper alignment of the first port 402 and an opening (e.g., the opening 426) of the member 410, such that fluid can flow between the first port 402 and the third port 406 without interruption.

The body of the system may be in any suitable shape. In some aspects, when the central passage has a length extending between the first port and the second port, and the central passage has a cross-section in a plane parallel to the length, the cross-section may be rectangular (e.g., as shown in FIGS. 9A-13B).

In some aspects, when the central passage has a length extending between the first port and the second port, and the central passage has a cross-section in a plane parallel to the length, the cross-section may be circular, e.g., system 500 as shown in FIGS. 16A-17B. The system 500 may include a set of springs, each of which is positioned between the outer wall of the body 501 and the separator 533*a* or 533*b*. The system 500 may include spring guides similar to 431*a*, 431*b*, 434*a*, and 434*b* in the system 400. Alternatively, the system 500 may not include any spring guide.

In the system 500, the member 510 may have a slant lower surface 512 defining the lower boundary of the member 510 (e.g., in a position opposite the third port 506). When the system 500 transitions from the first state to the second state, the slant lower surface 512 of the member 510 is configured to push a substance from the central passage 508 to the second port 504. The substance may be solids or semi-solids such as debris and/or clots in the central passage 508. The debris or clots may be from or derived from a fluid passing through the system 500 when the system 500 is in the first state. The slant lower surface 512 can push the debris and clots out of the system 500 to ensure that the valve (e.g., the member 510 of the valve) can be moved from the first position down to the second position, which may allow proper alignment of the first port 502 and an opening of the member 510, such that fluid can flow between the first port 502 and the third port 506 without interruption.

FIGS. 18A-18J illustrate a system 600 for directing fluid flow according to some aspects. In some aspects, the system 600 may include a first port 602, a second port 604, a third port 606, a body 601 including a central passage 608, and a valve. In some aspects, as shown in FIGS. 18C-18F, the valve of the system 600 may be a flip valve. In some alternative aspects, as shown in FIGS. 18G-18J, the valve of the system 600 may be a hammock valve. In some aspects, the first port 602 may be configured to be coupled to a first channel, the second port 604 may be configured to be coupled to a second channel, and the third port 606 may be configured to be coupled to a device defining a third channel. In some aspects, the central passage 608 may connect the first port 602, the second port 604, and the third port 606.

In some aspects, the third port 606 may include a female fitting 614. In some aspects, the female fitting 614 of the third port 606 may have an internal surface and an external surface, and the external surface of the female fitting 614 may include a thread configured to engage, for example and without limitation, a Luer lock.

In some aspects, as shown in FIGS. 18C-18J, the valve may include a member 610, a stem 618, and an elastic flange 632. In some aspects, the member 610 may include a slant lower surface 612 that defines a lower boundary of the member 610. In some aspects, as shown in FIGS. 18C-18J, a periphery (e.g., all or a portion of the periphery) of the elastic flange 632 may be fixed to the body 601.

In some aspects, the system 600 may be configured to be in a first state (e.g., as shown in FIGS. 18C, 18D, 18G, and 18H) if a male fitting of the device is not inserted in the female fitting 614 of the third port 606. In some aspects, as shown in FIGS. 18C, 18D, 18G, and 18H, the valve may be configured to be in a first position if the system 600 is in the first state. In some aspects, the valve may be configured to block a first fluid path defined between the first port 602 and the third port 606 if the valve is in the first position. In this way, the valve may act as a diaphragm.

In some aspects, the system may be configured to be in a second state (e.g., as shown in FIGS. 18E, 18F, 18I, and 18J) if a male fitting of the device is fully inserted in the female fitting 614 of the third port 606. In some aspects, as shown in FIGS. 18E, 18F, 18I, and 18J, the valve may be configured to be in a second position if the system 600 is in the second state. In some aspects, the valve may be configured to connect the first fluid path and block a second fluid path defined between the first port 602 and the second port 604 if the valve is in the second position. In some aspects, the system 600 may be configured such that inserting a male fitting into the female fitting 614 of the third port 606 causes the system 600 to transition from the first state to the second state.

In some aspects, a top of the stem 618 may extend into the third port 606 in a direction away from the central passage 608 if the valve is in the first position. In some aspects, if the valve is in the second position, the top of the stem 618 may be below a thread on an external surface of the female fitting 614, which may be configured to engage, for example and without limitation, a Luer lock, in a direction toward the central passage 608. In some aspects, the stem 618 may extend from the elastic flange 632.

In some aspects, the member 610 of the valve may include a channel 624, a first opening, and a second opening. In some aspects, the system 600 may be configured such that, if the system 600 is in the second state (e.g., as shown in FIGS. 16E and 16F), fluid flows from the first port 602, into the first opening of the member 610, through the channel 624 of the member 610, out of the second opening of the member 610, and out of the third port 606. In some aspects, the system 600 may be configured such that, if the system 600 is in the second state, fluid flows from the third port 606, into the second opening of the member 610, through the channel 624 of the member 610, out of the first opening of the member 610, and out of the first port 602.

In some aspects, as shown in FIGS. 18C-18J, a shape of the elastic flange 632 of the valve in the first position (e.g., as shown in FIGS. 18C, 18D, 18G, and 18H) may be different than a shape of the elastic flange 632 of the valve in the second position (e.g., as shown in FIGS. 18E, 18F, 18I, and 18J). In some aspects, the elastic flange 632 may bias the valve toward the first position of the valve. In some aspects, the elastic flange 632 may cause the valve to return from the second position to the first position when the male fitting is removed from the female fitting 614 of the third port 606. In some aspects, the valve may be made out of a material comprising an elastomer such as silicone. However, silicone is not required and, in some alternative aspects, the valve may be made out of a different elastomer material. In some aspects, the elastic flange 632 may enable the system 600 to return from the second position to the first position when the male fitting is removed from the female fitting 614 of the third port 606 without the use of one or more springs, which may be made of metal, may make a system less safe (e.g., due to corrosion), and/or may make a system more expensive.

In some aspects, the central passage 608 may have a length extending between the first port 602 and the second port 604, and the central passage 608 may have a cross-section in a plane parallel to the length. In some aspects, the cross-section may be rectangular. In some alternative aspects, the cross-section may be circular. In some further alternative aspects, the cross-section may have a different shape. In some aspects, the third port 606 may include a first portion having a first diameter and a second portion having a second diameter greater than the first diameter.

In any of the aspects above, the valve may be manufactured as a single piece (e.g., as shown in FIGS. 9A-13B, 16A-17B, and 18C-18J). In some aspects, the single piece may be a single material (e.g., an elastomer such as silicone). In some aspects, the single piece valve may include the member (e.g., member 410, 510, or 610), the stem (e.g., stem 418, 518, or 618), and/or the flange (e.g., flange 432, 532, or 632). In any of the aspects above, the valve may alternatively be a valve assembly comprising multiple components coupled together (e.g., as shown in FIGS. 2, 3, 5, 7, and 8). In some aspects, the multiple components may include the member (e.g., member 110), the stem (e.g., stem 118), and/or the flange.

In some aspects, the slant lower surface 612 may be configured to push a substance from the central passage 608 to the second port 604 when the system transitions from the first state (e.g., as shown in FIGS. 18C, 18D, 18G, and 18H) to the second state (e.g., as shown in FIGS. 18E, 18F, 18I, and 18J). In some examples, the slant lower surface 112, 412, 512, or 612 may have an slope from 0° to 90°, e.g., from 10° to 80°, from 10° to 15°, from 15° to 20°, from to 25°, from 25° to 30°, from 30° to 35°, from 35° to 40°, from 40° to 45°, from 45° to 50°, from 50° to 55°, from 55° to 60°, from 60° to 65°, from 65° to 70°, from 70° to 75°, or from 75° to 80°. In some examples, the slope may be from 35° to 55°, e.g., from 40° to 50°, from 42° to 48°, or from 44° to 46°. In some examples, the slope may be 55°, 54°, 53°, 52°, 51°, 50°, 49°, 48°, 47°, 46°, 45°, 44°, 43°, 42°, 41°, 40°, 39°, 38°, 37°, 36°, 35°.

The slope may be defined by the angle between the lower surface 112, 412, 512, or 612 and a bottom of the central passage 108, 408, 508, or 608.

In some aspects, the system may be configured in other ways to push debris and clots out of the central passage. For example, the bottom of the central passage may be slant such that there is an angle between the lower surface of the member and the bottom of the central passage. In such cases, the lower surface of the member may be slant or level.

As used herein, a "sample" may contain a tissue, a cell (e.g., a live cell), cell debris, a bodily fluid from a subject (e.g., a patient), a cell culture, or a cell culture from a bodily fluid. In some aspects, the sample may be a bodily fluid. A bodily fluid may be urine, amniotic fluid, aqueous humour, vitreous humour, bile, blood, blood serum, breast milk, cerebrospinal fluid, cerumen (earwax), chyle, chyme, endolymph, perilymph, exudates, feces, male ejaculate, female secretions, gastric acid, gastric juice, lymph, mucus (including nasal drainage and phlegm), pericardial fluid, peritoneal fluid, pleural fluid, pus, rheum, saliva, sebum (skin oil), semen, sputum, synovial fluid, sweat, tears, vaginal secretion, vomit, or other bodily fluid, or a mixture thereof.

The terms "subject," "individual," and "patient" are used interchangeably herein to refer to a vertebrate. A subject may be a mammal, such as a human. Examples of mammals include rodents (e.g., rats, mice), rabbits, primates (e.g., human), farm animals (cows), sport animals (e.g., horses), and pets (e.g., dogs, cats).

The term "exemplary" is used herein to mean serving as an example, instance, or illustration. Any aspect or design described herein as "exemplary" is not necessarily to be construed as preferred or advantageous over other aspects or designs.

Various aspects are described hereinafter. It should be noted that the specific aspects are not intended as an exhaustive description or as a limitation to the broader aspects discussed herein. One feature described in conjunction with a particular aspect is not necessarily limited to that aspect and can be practiced with any other aspect(s). Reference throughout this specification to "one aspect", "an aspect," "some aspects," or "an example aspect" means that a particular feature, structure or characteristic described in connection with the aspect is included in at least one aspect of the present invention. Thus, appearances of the phrases "in one aspect," "in an aspect," "some aspects," or "an example aspect" in various places throughout this specification are not necessarily all referring to the same aspect, but may. Furthermore, the particular features, structures or characteristics may be combined in any suitable manner, as would be apparent to a person skilled in the art from this disclosure, in one or more aspects. Furthermore, while some aspects described herein include some but not other features included in other aspects, combinations of features of different aspects are meant to be within the scope of the invention. For example, in the appended claims, any of the claimed aspects can be used in any combination.

The present application also provides aspects and aspects as set forth in the following numbered Statements:

Statement 1. A system for directing fluid flow, the system comprising: a first port configured to be coupled to a first channel; a second port configured to be coupled to a second channel; a third port configured to be coupled to a device defining a third channel, the third port comprising a female fitting; a central passage, the central passage connecting the first port, the second port, and the third port; and a valve assembly comprising a member that has a slant lower surface, the slant lower surface defining a lower boundary of the member in a position opposite the third port; wherein: the system has a first state in which a male fitting of the device is not inserted in the female fitting of the third port, the member of the valve assembly blocking a first fluid path defined between the first port and the third port when the system is in the first state; the system has a second state in which a male fitting of the device is fully inserted in the female fitting of the third port, the member of the valve assembly connecting the first fluid path and blocking a second fluid path defined between the first port and the second port when the system is in the second state, and the system is configured such that inserting a male fitting into the female fitting of the third port causes the system to transition from the first state to the second state, and the slant lower surface of the member of the valve assembly is configured to push a substance from the central passage to the second port when the system transitioning from the first state to the second state.

Statement 2. A system for directing fluid flow, the system comprising: a first port configured to be coupled to a first channel; a second port configured to be coupled to a second channel; a third port configured to be coupled to a device defining a third channel, the third port comprising a female fitting; a central passage, the central passage connecting the first port, the second port, and the third port; a valve assembly comprising a member; and one or more springs; wherein: the system has a first state in which a male fitting of the device is not inserted in the female fitting of the third port, the member of the valve assembly blocking a first fluid path defined between the first port and the third port when the system is in the first state; the system has a second state in which a male fitting of the device is fully inserted in the female fitting of the third port, the member of the valve assembly connecting the first fluid path and blocking a second fluid path defined between the first port and the second port when the system is in the second state, and the system is configured such that inserting a male fitting into the female fitting of the third port causes the system to transition from the first state to the second state, and the one or more springs biases the member toward a position of the member in the first state, and the one or more springs is positioned such that the one or more springs is isolated from the fluid flow in the system.

Statement 3. The system of Statement 2, wherein the valve assembly comprises a member that has a slant lower surface, the slant lower surface defines a lower boundary of the member in a position opposite the third port, and the slant lower surface is configured to push a substance from the central passage to the second port when the system transitioning from the first state to the second state.

Statement 4. The system of Statement 2 or 3, further comprising one or more spring guides for positioning the one or more springs.

Statement 5. The system of Statement 2, 3, or 4, further comprising one or more separators, each separator positioned between one of the one or more springs and the member.

Statement 6. The system of any one or combination of Statements 1 to 5, wherein the female fitting of the third port has an internal surface and an external surface, and the external surface of the female fitting comprises a thread configured to engage a Luer lock.

Statement 7. The system of any one or combination of Statements 1 to 6, further comprising a stem coupled to the member of the valve assembly and disposed at least partially within the third port, wherein a top of the stem extends beyond the third port in a direction away from the central passage when the system is in the first stage.

Statement 8. The system of Statement 7, wherein, when the system is in the second state, the top of the stem is below the thread that is configured to engage the Luer lock in a direction toward the central passage.

Statement 9. The system of Statement 7 or 8, wherein the stem is coupled to a flange, and wherein, when the system is in the first state, a first surface of the flange engages a shoulder of the third port, and a second surface of the flange engages the spring.

Statement 10. The system of any one or combination of Statements 1 to 9, wherein the central passage has a length extending between the first port and the second port, and the central passage has a cross-section in a plane parallel to the length, the cross-section being rectangular.

Statement 11. The system any one or combination of Statements 1 to 9, wherein the central passage has a length extending between the first port and the second port, and the central passage has a cross-section in a plane parallel to the length, the cross-section being circular.

Statement 12. The system of any one or combination of Statements 1 to 11, wherein the third port comprises a first portion having a first diameter and a second portion having a second diameter greater than the first diameter.

Statement 13. The system of any one or combination of Statements 1 to 12, wherein the member of the valve assembly comprises a channel, a first opening, and a second opening, and the system is configured such that when the system is in the second state, the fluid flows from the first port, into the first opening of the member, through the channel of the member, out of the second opening of the member, and out of the third port.

Statement 14. The system of any one or combination of Statements 1 to 13, wherein the member of the valve assembly comprises a channel, a first opening, and a second opening, and the system is configured such that when the system is in the second state, the fluid flows from the third port, into the second opening of the member, through the channel of the member, out of the first opening of the member, and out of the first port.

Statement 15. A method for directing fluid flow using a system comprising a first port, a second port, a third port, a central passage, and a valve assembly comprising a member, the method comprising: connecting the first port to a first channel; connecting the second port to a second channel; and connecting the third port to a device defining a third channel, the third port comprising a female fitting, wherein the first port, the second port, and the third port are connected to each other via the central passage; wherein: connecting the third port to the third channel causes the system to transition from a first state to a second state; in the first state, a male fitting of the device is not is inserted in the female fitting of the third port, and the valve assembly comprises a member that blocks a first fluid path defined between the first port and the third port; and in the second state, the male fitting of the device is fully inserted in the female fitting of the third port, and the member of the valve assembly connects the first fluid path and blocks a second fluid path defined between the first port and the second port, and the member of the valve assembly has a slant lower surface, the slant lower surface defining a lower boundary of the member in a position opposite the third port and configured to push a substance in the fluid from the central passage to the second port when the system transitions from the first state the second state.

Statement 16. A method for directing fluid flow using a system comprising a first port, a second port, a third port, a central passage, a valve assembly comprising a member, and one or more springs, the method comprising: connecting the first port to a first channel; connecting the second port to a second channel; and connecting the third port to a device defining a third channel, the third port comprising a female fitting, wherein the first port, the second port, and the third port are connected to each other via the central passage; wherein: connecting the third port to the third channel causes the system to transition from a first state to a second state; in the first state, a male fitting of the device is not is inserted in the female fitting of the third port, and the valve assembly comprises a member that blocks a first fluid path defined between the first port and the third port; and in the second state, the male fitting of the device is fully inserted in the female fitting of the third port, and the member of the valve assembly connects the first fluid path and blocks a second fluid path defined between the first port and the second port, and the one or more springs biases the member toward a position of the member in the first state, and the one or more springs is positioned such that the one or more springs is isolated from the fluid flow in the system.

Statement 17. The method of Statement 16, wherein the member that has a slant lower surface, the slant lower surface defines a lower boundary of the member in a position opposite the third port, and the slant lower surface is configured to push a substance from the central passage to the second port when the system transitioning from the first state to the second state.

Statement 18. The method of Statement 16 or 17, wherein the system further comprises one or more spring guides for positioning the one or more springs.

Statement 19. The method of Statement 16, 17, or 18, wherein the system further comprises one or more separators, each separator positioned between one of the one or more springs and the member.

Statement 20. The method of any one or combination of Statements 15 to 19, wherein the female fitting of the third port has an internal surface and an external surface, and the external surface of the female fitting comprises a thread configured to engage a Luer lock.

Statement 21. The method of any one or combination of Statements 15 to 20, wherein the system further comprises a stem coupled to the member of the valve assembly and disposed at least partially within the third port, and a top of the stem extends beyond the third port in a direction away from the central passage when the system is in the first stage.

Statement 22. The method of Statement 21, wherein, when the system is in the second state, the top of the stem is below the thread configured to engage the Luer lock in a direction toward the central passage.

Statement 23. The method of Statement 21, wherein the stem is coupled to a flange, and wherein when the system is in the first state, a first surface of the flange engages a shoulder of the third port, and a second surface of the flange engages the spring.

Statement 24. The method of any one or combination of Statements 15 to 23, wherein the central passage has a length extending between the first port and the second port, and the central passage has a cross-section in a plane parallel to the length, the cross-section being rectangular.

Statement 25. The method of any one or combination of Statements 15 to 23, wherein the central passage has a length extending between the first port and the second port, and the central passage has a cross-section in a plane parallel to the length, the cross-section being circular.

Statement 26. The method of any one or combination of Statements 15 to 25, wherein the third port comprises a first portion having a first diameter and a second portion having a second diameter greater than the first diameter.

Statement 27. The method of any one or combination of Statements 15 to 26, wherein the member of the valve assembly comprises a channel, a first opening, and a second opening, and the system is configured such that when the system is in the second state, the fluid flows from the first port, into the first opening of the member, through the channel of the member, out of the second opening of the member, and out of the third port.

Statement 28. The method of any one or combination of Statements 15 to 27, wherein the member of the valve assembly comprises a channel, a first opening, and a second opening, and the system is configured such that when the system is in the second state, the fluid flows from the third port, into the second opening of the member, through the channel of the member, out of the first opening of the member, and out of the first port.

Statement 29. A method of directing a fluid between a subject and a container using the system of any one or combination of Statements 1 to 14, the method of comprising: connecting the first port to the subject via the first channel; connecting the second port to a container via the second channel; setting the system to the first state such that: the fluid flows from the subject to the central passage via the first port and from the central passage to the container via the second port, or the fluid flows from the container to the central passage via the second port and from the central passage to the subject via the first port.

Statement 30. The method of Statement 29, comprising setting the system to the first state such that the fluid flows from the subject to the central passage via the first port and from the central passage to the container via the second port.

Statement 31. The method of Statement 29, comprising setting the system to the first state so that the fluid flows from the container to the central passage via the second port and from the central passage to the subject via the first port.

Statement 32. A method of directing a fluid between a subject and a device using the system of any one or combination of Statements 1 to 14, the method of comprising connecting the first port to the subject via the first channel; connecting the third port to the device defining the third channel via the third port; setting the system to the second state such that: the fluid flows from the device to the central passage via the third port and from the central passage to the subject via the first port, or the fluid flows from the subject to the central passage via the first port and from the central passage to the device via the third port.

Statement 33. The method of Statement 32, comprising setting the system to the second state such that the fluid flows from the device to the central passage via the third port and from the central passage to the subject via the first port.

Statement 34. The method of Statement 32, comprising setting the system to the second state such that the fluid flows from the subject to the central passage via the first port and from the central passage to the device via the third port.

Statement 35. The method of any one of Statements 29 to 34, wherein the first port is connected to a bladder of the subject via the first channel.

Statement 36. The method of Statement 30 or 34, wherein the fluid comprises a bodily fluid.

Statement 37. The method of Statement 36, wherein the bodily fluid comprises urine.

Statement 38. The method of Statement 31 or 33, wherein the fluid comprises a therapeutic or diagnostic agent.

While the subject matter of this disclosure has been described and shown in considerable detail with reference to certain illustrative aspects, including various combinations and sub-combinations of features, those skilled in the art will readily appreciate other aspects and variations and modifications thereof as encompassed within the scope of the present disclosure. Moreover, the descriptions of such aspects, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

What is claimed is:

1. A system for directing fluid flow, the system comprising:
   a first port configured to be coupled to a first channel;
   a second port configured to be coupled to a second channel;
   a third port configured to be coupled to a device defining a third channel, the third port comprising a female fitting;
   a body comprising a central passage connecting the first port, the second port, and the third port;
   a valve comprising a member that includes a slant lower surface, the slant lower surface defining a lower boundary of the member; and
   one or more springs;
   wherein:
   the system is configured to be in a first state if a male fitting of the device is not inserted in the female fitting of the third port, the valve is configured to be in a first position if the system is in the first state, and the valve is configured to block a first fluid path defined between the first port and the third port when the valve is in the first position;
   the system is configured to be in a second state if a male fitting of the device is fully inserted in the female fitting of the third port, the valve is configured to be in a second position if the system is in the second state, and the valve is configured to connect the first fluid path and block a second fluid path defined between the first port and the second port if the valve is in the second position;

the system is configured such that inserting a male fitting into the female fitting of the third port causes the system to transition from the first state to the second state;

the slant lower surface of the member of the valve is configured to push a substance from the central passage to the second port when the system transitions from the first state to the second state;

the one or more springs bias the valve toward the first position of the valve; and the one or more springs are positioned such that the one or more springs are isolated from the fluid flow in the system.

2. The system of claim 1, wherein the valve further comprises an elastic flange, a periphery of the elastic flange being fixed to the body.

3. The system of claim 2, wherein the valve is made out of a material comprising an elastomer.

4. The system of claim 1, further comprising one or more spring guides for positioning the one or more springs.

5. The system of claim 1, further comprising one or more separators, each of the one or more separators positioned between one of the one or more springs and the member of the valve.

6. The system of claim 1, wherein the valve comprises a flange including first and second surfaces, the first surface of the flange faces the third port, the second surface of the flange faces away from the third port, and the second surface of the flange engages the one or more springs.

7. The system of claim 1, wherein the female fitting of the third port has an internal surface and an external surface, and the external surface of the female fitting comprises a thread configured to engage a Luer lock.

8. The system of claim 1, wherein the valve comprises a stem, and a top of the stem extends into the third port in a direction away from the central passage if the valve is in the first position.

9. The system of claim 8, wherein, if the valve is in the second position, the top of the stem is below a thread on an external surface of the female fitting that is configured to engage a Luer lock in a direction toward the central passage.

10. The system of claim 8, wherein the valve further comprises a flange, and the stem extends from the flange.

11. The system of claim 1, wherein the valve is a valve assembly comprising multiple components coupled together.

12. The system of claim 11, wherein the multiple components comprise the member and a stem, wherein a top of the stem extends into the third port in a direction away from the central passage if the valve is in the first position.

13. The system of claim 1, wherein the valve is manufactured as a single piece.

14. A system for directing fluid flow, the system comprising:

a first port configured to be coupled to a first channel;

a second port configured to be coupled to a second channel;

a third port configured to be coupled to a device defining a third channel, the third port comprising a female fitting;

a body comprising a central passage connecting the first port, the second port, and the third port; and a valve comprising a member that includes a slant lower surface, the slant lower surface defining a lower boundary of the member;

wherein:

the system is configured to be in a first state if a male fitting of the device is not inserted in the female fitting of the third port, the valve is configured to be in a first position if the system is in the first state, and the valve is configured to block a first fluid path defined between the first port and the third port when the valve is in the first position;

the system is configured to be in a second state if a male fitting of the device is fully inserted in the female fitting of the third port, the valve is configured to be in a second position if the system is in the second state, and the valve is configured to connect the first fluid path and block a second fluid path defined between the first port and the second port if the valve is in the second position;

the system is configured such that inserting a male fitting into the female fitting of the third port causes the system to transition from the first state to the second state;

the slant lower surface of the member of the valve is configured to push a substance from the central passage to the second port when the system transitions from the first state to the second state;

the member of the valve comprises a channel, a first opening, and a second opening, and the system is configured such that, if the system is in the second state, fluid flows from the first port, into the first opening of the member, through the channel of the member, out of the second opening of the member, and out of the third port.

15. The system of claim 14, further comprising one or more springs, wherein the one or more springs bias the valve toward the first position of the valve, and the one or more springs are positioned such that the one or more springs are isolated from the fluid flow in the system.

16. A system for directing fluid flow, the system comprising:

a first port configured to be coupled to a first channel;

a second port configured to be coupled to a second channel;

a third port configured to be coupled to a device defining a third channel, the third port comprising a female fitting;

a body comprising a central passage connecting the first port, the second port, and the third port; and a valve comprising a member that includes a slant lower surface, the slant lower surface defining a lower boundary of the member;

wherein:

the system is configured to be in a first state if a male fitting of the device is not inserted in the female fitting of the third port, the valve is configured to be in a first position if the system is in the first state, and the valve is configured to block a first fluid path defined between the first port and the third port when the valve is in the first position;

the system is configured to be in a second state if a male fitting of the device is fully inserted in the female fitting of the third port, the valve is configured to be in a second position if the system is in the second state, and the valve is configured to connect the first fluid path and block a second fluid path defined between the first port and the second port if the valve is in the second position;

the system is configured such that inserting a male fitting into the female fitting of the third port causes the system to transition from the first state to the second state;
the slant lower surface of the member of the valve is configured to push a substance from the central passage to the second port when the system transitions from the first state to the second state;
the member of the valve comprises a channel, a first opening, and a second opening, and
the system is configured such that, if the system is in the second state, fluid flows from the third port, into the second opening of the member, through the channel of the member, out of the first opening of the member, and out of the first port.

17. A system for directing fluid flow, the system comprising:
a first port configured to be coupled to a first channel;
a second port configured to be coupled to a second channel;
a third port configured to be coupled to a device defining a third channel, the third port comprising a female fitting;
a body comprising a central passage connecting the first port, the second port, and the third port; and
a valve comprising a member and an elastic flange, a periphery of the elastic flange being fixed to the body;
wherein:
the system is configured to be in a first state if a male fitting of the device is not inserted in the female fitting of the third port, the valve is configured to be in a first position if the system is in the first state, and the valve is configured to block a first fluid path defined between the first port and the third port if the valve is in the first position;
the system is configured to be in a second state if a male fitting of the device is fully inserted in the female fitting of the third port, the valve is configured to be in a second position if the system is in the second state, and the valve is configured to connect the first fluid path and block a second fluid path defined between the first port and the second port if the valve is in the second position;
the system is configured such that inserting a male fitting into the female fitting of the third port causes the system to transition from the first state to the second state;
a shape of the elastic flange of the valve in the first position is different than a shape of the elastic flange of the valve in the second position;
the elastic flange biases the valve toward the first position of the valve;
the member of the valve comprises a channel, a first opening, and a second opening, and
the system is configured such that, if the system is in the second state, fluid flows (a) from the first port, into the first opening of the member, through the channel of the member, out of the second opening of the member, and out of the third port or (b) from the third port, into the second opening of the member, through the channel of the member, out of the first opening of the member, and out of the first port.

18. The system of claim 17, wherein the valve is made out of a material comprising an elastomer.

19. The system of claim 17, wherein the member includes a slant lower surface that defines a lower boundary of the member, and the slant lower surface is configured to push a substance from the central passage to the second port when the system transitions from the first state to the second state.

20. A method for directing fluid flow using a system comprising a first port, a second port, a third port, a body comprising a central passage, a valve comprising a member, and one or more springs, the method comprising:
connecting the first port to a first channel;
connecting the second port to a second channel; and
connecting the third port to a device defining a third channel, the third port comprising a female fitting, wherein the first port, the second port, and the third port are connected to each other via the central passage;
wherein:
the system is configured to be in a first state if a male fitting of the device is not inserted in the female fitting of the third port;
the valve is configured to be in a first position if the system is in the first state;
the system is configured to be in a second state if the male fitting of the device is fully inserted in the female fitting of the third port;
the valve is configured to be in a second position if the system is in the second state;
connecting the third port to the third channel comprises fully inserting the male fitting of the device into the female fitting of the third port;
connecting the third port to the third channel causes the system to transition from the first state to the second state;
in the first position, the valve blocks a first fluid path defined between the first port and the third port;
in the second position, the valve connects the first fluid path and blocks a second fluid path defined between the first port and the second port;
the member of the valve includes a slant lower surface, the slant lower surface defining a lower boundary of the member;
transitioning from the first state to the second state comprises the slant lower surface pushing a substance from the central passage to the second port;
the method further comprises using the one or more springs to bias the valve toward the first position of the valve; and
the one or more springs are positioned such that the one or more springs are isolated from the fluid flow in the system.

21. A method for directing fluid flow using a system comprising a first port, a second port, a third port, a body comprising a central passage, and a valve comprising a member and an elastic flange, the method comprising:
connecting the first port to a first channel;
connecting the second port to a second channel; and
connecting the third port to a device defining a third channel, the third port comprising a female fitting, wherein the first port, the second port, and the third port are connected to each other via the central passage;
wherein:
a periphery of the elastic flange is fixed to the body;
the system is configured to be in a first state if a male fitting of the device is not inserted in the female fitting of the third port;
the valve is configured to be in a first position if the system is in the first state;
the system is configured to be in a second state if a male fitting of the device is fully inserted in the female fitting of the third port;

the valve is configured to be in a second position if the system is in the second state;

connecting the third port to the third channel comprises fully inserting the male fitting of the device into the female fitting of the third port;

connecting the third port to the third channel causes the system to transition from the first state to the second state;

in the first position, the valve blocks a first fluid path defined between the first port and the third port;

in the second position, the valve connects the first fluid path and blocks a second fluid path defined between the first port and the second port;

a shape of the elastic flange of the valve in the first position is different than a shape of the elastic flange of the valve in the second position;

the elastic flange biases the valve toward the first position of the valve;

the member of the valve comprises a channel, a first opening, and a second opening, and if the system is in the second state, fluid flows (a) from the first port, into the first opening of the member, through the channel of the member, out of the second opening of the member, and out of the third port or (b) from the third port, into the second opening of the member, through the channel of the member, out of the first opening of the member, and out of the first port.

* * * * *